(12) United States Patent
Kärkkäinen et al.

(10) Patent No.: US 10,321,124 B2
(45) Date of Patent: Jun. 11, 2019

(54) DISPLAY OF A VISUAL REPRESENTATION OF A VIEW

(71) Applicant: Nokia Technologies Oy, Espoo (FI)

(72) Inventors: Leo Kärkkäinen, Helsinki (FI); Mikko Uusitalo, Helsinki (FI); Akos Vetek, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 304 days.

(21) Appl. No.: 15/106,789

(22) PCT Filed: Jan. 10, 2014

(86) PCT No.: PCT/FI2014/050018
§ 371 (c)(1),
(2) Date: Jun. 20, 2016

(87) PCT Pub. No.: WO2015/104446
PCT Pub. Date: Jul. 16, 2015

(65) Prior Publication Data
US 2017/0195665 A1    Jul. 6, 2017

(51) Int. Cl.
*G06F 3/01* (2006.01)
*G06T 15/08* (2011.01)
(Continued)

(52) U.S. Cl.
CPC ........... *H04N 13/361* (2018.05); *G06F 3/013* (2013.01); *G06F 3/04815* (2013.01);
(Continued)

(58) Field of Classification Search
CPC ...... G06F 3/011; G06F 3/013; G06F 3/04815; G02B 2027/0138; G02B 27/01;
(Continued)

(56) References Cited

U.S. PATENT DOCUMENTS 3,885,095 A * 5/1975 Wolfson ................. G02B 27/01
348/115
5,917,460 A * 6/1999 Kodama ............ G02B 27/0093
345/7

(Continued)

FOREIGN PATENT DOCUMENTS

DE          19542604         5/1996
EP          2410733          1/2012
(Continued)

OTHER PUBLICATIONS

International Search Report and Written Opinion received for corresponding Patent Cooperation Treaty Application No. PCT/FI2014/050018, dated Sep. 10, 2014, 12 pages.

(Continued)

*Primary Examiner* — Chia Wei A Chen
(74) *Attorney, Agent, or Firm* — Alston & Bird LLP

(57) ABSTRACT

A method comprising determining a view from a location, the view comprising visual information that is perceivable along a direction extending from the location, causing display of a visual representation of the view on a display such that the view is viewable by a user at a focal depth, determining a different view from the location, the different view comprising visual information that is perceivable along a different direction extending from the location, and causing display of a visual representation of the different view on the display such that the different view is viewable by the user at a different focal depth is disclosed.

20 Claims, 10 Drawing Sheets

(51) Int. Cl.
  *G06F 3/0481* (2013.01)
  *H04N 13/156* (2018.01)
  *H04N 13/344* (2018.01)
  *H04N 13/361* (2018.01)
  *H04N 13/383* (2018.01)
  *H04N 13/395* (2018.01)
  *H04N 13/398* (2018.01)

(52) U.S. Cl.
  CPC ............ *G06T 15/08* (2013.01); *H04N 13/156* (2018.05); *H04N 13/344* (2018.05); *H04N 13/383* (2018.05); *H04N 13/395* (2018.05); *H04N 13/398* (2018.05)

(58) Field of Classification Search
  CPC .. G06T 19/006; H04N 13/344; H04N 13/398; H04N 13/279; H04N 13/361; H04N 13/395
  See application file for complete search history.

(56) References Cited

U.S. PATENT DOCUMENTS

| | | | |
|---|---|---|---|
| 8,199,974 | B1 | 6/2012 | Prada Gomez et al. |
| 8,990,682 | B1* | 3/2015 | Wong ............... G02B 27/017 715/254 |
| 9,671,612 | B2* | 6/2017 | Kress ............... G02B 27/0172 |
| 2002/0126396 | A1* | 9/2002 | Dolgoff ............ G02B 27/2278 359/743 |
| 2004/0135973 | A1 | 7/2004 | Gustafsson et al. |
| 2010/0287500 | A1 | 11/2010 | Whitlow et al. |
| 2011/0175932 | A1* | 7/2011 | Yu ..................... G06F 3/013 345/661 |
| 2013/0050432 | A1* | 2/2013 | Perez ................ G02B 27/017 348/47 |
| 2013/0083003 | A1 | 4/2013 | Perez et al. |
| 2013/0305437 | A1* | 11/2013 | Weller ............... A42B 3/0406 2/422 |
| 2013/0342525 | A1* | 12/2013 | Benko ................ G06F 3/013 345/419 |
| 2016/0103326 | A1* | 4/2016 | Kimura ............. G02B 27/017 345/690 |
| 2017/0039772 | A1* | 2/2017 | Mukawa .............. G02B 3/12 |

FOREIGN PATENT DOCUMENTS

| | | |
|---|---|---|
| EP | 2618202 A1 | 7/2013 |
| GB | 2295757 A | 6/1996 |
| JP | H02-186319 A | 7/1990 |
| JP | 2005-172851 A | 6/2005 |
| WO | 2012/064546 A1 | 5/2012 |
| WO | 2013/049248 A2 | 4/2013 |

OTHER PUBLICATIONS

Office action received for corresponding Canadian Patent Application No. 2935434, dated Feb. 28, 2018, 4 pages.

"See-Through Armor (STA)", Elbit Systems, Retrieved on Nov. 14, 2017, Webpage available at : http://elbitsystems.com/media/See_Through_Armor.pdf.

"Awesome Demonstration of the F 35 5th Generation Joint Strike Fighter's Cockpit", LiveLeak, Retrieved on Nov. 14, 2017, Webpage available at : https://www.liveleak.com/view?i=f20_1342071775.

"Advanced Distributed Aperture System (ADAS)", Youtube, Retrieved on Nov. 14, 2017, Webpage available at : https://www.youtube.com/watch?v=PhrgH_u24dc.

Kopper et al., "Towards an Understanding of the Effects of Amplified Head Rotation", The 3rd IEEE VR Workshop on Perceptual Illusions in Virtual Environments, vol. 2, 2011, 6 pages.

"Fovea-contingent display (FCD)", The University of Arizona, College of Optical Sciences, Retrieved on Nov. 14, 2017, Webpage available at : https://wp.optics.arizona.edu/3dvis/research/fovea-contingent-display/.

Liu et al., "An Optical See-Through Head Mounted Display with Addressable Focal Planes", 7th IEEE/ACM International Symposium on Mixed and Augmented Reality, Sep. 15-18, 2008, pp. 33-42.

Kim et al., "Development of a HMD-type Multifocus 3D Display System using LEDs", Proceedings of SPIE Three-Dimensional TV, Video, and Display, vol. 6392, Oct. 17, 2006, pp. 63920B-1-63920B-9.

"FlyViz puts Eyes in the Back of Your Head", NewAtlas, Retrieved on Nov. 15, 2017, Webpage available at : https://newatlas.com/flyviz-360-degree-view/25432/.

Rolland et al., "Multifocal Planes Head-mounted Displays", Applied Optics, vol. 39, No. 19, Jul. 1, 2000, pp. 3209-3215.

"Oculus Rift Creator Builds 120 and 270 Degree Fov Hmd Prototypes", Road Tovr, Retrieved on Nov. 15, 2017, Webpage available at : https://www.roadtovr.com/oculus-rift-creator-built-120-and-270-degree-fov-hmd-prototypes/.

Schowengerdt et al., "True Three dimensional Displays That Allow Viewers to Dynamically Shift Accommodation, Bringing Objects Displayed at Different Viewing Distances Into and Out of Focus", Cyberpsychology & Behavior, vol. 7, No. 6, 2004, pp. 610-620.

Akeley, "Achieving Near correct Focus Cues Using Multiple Image Planes", Thesis, Jun. 2004, 173 pages.

"Near-Eye Light Field Displays", NVidia, Retrieved on Nov. 15, 2017, Webpage available at : http://research.nvidia.com/publication/near-eye-light-field-displays.

"NVIDIA Research's near-eye light field display prototype eyes-on (video)", Engadget, Retrieved on Nov. 15, 2017, Webpage available at : https://www.engadget.com/2013/07/24/nvidia-research-near-eye-light-field-display-prototype/.

Kumar, "Gaze-Enhanced User Interface Design", Dissertation, May 2007, 164 pages.

Office action received for corresponding Japanese Patent Application No. 2016-545778, dated Oct. 31, 2017, 3 pages of office action and 4 pages of translation available.

Office action received for corresponding European Patent Application No. 14701590.3, dated Nov. 16, 2017, 7 pages.

Office Action for Canadian Applicatoin No. 2,935,434 dated Jan. 30, 2019, 5 pages.

* cited by examiner

DISPLAY OF A VISUAL REPRESENTATION OF A VIEW

RELATED APPLICATION

This application was originally filed as PCT Application No. PCT/FI2014/050018 filed Jan. 10, 2014.

TECHNICAL FIELD

The present application relates generally to display of a visual representation of a view.

BACKGROUND

As electronic apparatuses become increasingly pervasive in our society, it may be desirable to allow for utilization of such electronic apparatuses in a manner which facilitates perception of real environments. For example, a user of an electronic apparatus may desire to perceive visual information beyond that the user may be able to see naturally, may desire to perceive visual information depicting a real environment of a distant geographic location, and/or the like, in a manner that is intuitive and adaptable.

SUMMARY

Various aspects of examples of the invention are set out in the claims.

One or more embodiments may provide an apparatus, a computer readable medium, a non-transitory computer readable medium, a computer program product, and a method for determining a view from a location, the view comprising visual information that is perceivable along a direction extending from the location, causing display of a visual representation of the view on a display such that the view is viewable by a user at a focal depth, determining a different view from the location, the different view comprising visual information that is perceivable along a different direction extending from the location, and causing display of a visual representation of the different view on the display such that the different view is viewable by the user at a different focal depth.

One or more embodiments may provide an apparatus, a computer readable medium, a computer program product, and a non-transitory computer readable medium having means for determining a view from a location, the view comprising visual information that is perceivable along a direction extending from the location, means for causing display of a visual representation of the view on a display such that the view is viewable by a user at a focal depth, means for determining a different view from the location, the different view comprising visual information that is perceivable along a different direction extending from the location, and means for causing display of a visual representation of the different view on the display such that the different view is viewable by the user at a different focal depth.

In at least one example embodiment, the display is a see-through display, and the view is visual information indicative of a non-unitary magnification of visual information that is perceivable along the direction from the location.

One or more example embodiments further perform receipt of camera visual information that is perceivable along the direction from a camera module, wherein determination of the view is based at least in part on the camera visual information.

In at least one example embodiment, the camera module is comprised by the apparatus.

In at least one example embodiment, the camera module is comprised by a separate apparatus.

In at least one example embodiment, the camera module is comprised by an apparatus worn by the user.

In at least one example embodiment, the camera module is comprised by an apparatus mounted to a vehicle.

One or more example embodiments further perform receipt of camera visual information, from a camera module, that is perceivable along the different direction from the location, wherein determination of the different view is based at least in part on the camera visual information.

In at least one example embodiment, the display of the visual representation of the view is performed such that a display region of the visual representation of the view overlaps with a display region of the visual representation of the different view.

In at least one example embodiment, the overlap is characterized by the display region of the visual representation of the view at least partially corresponding with the display region of the visual representation of the different view.

In at least one example embodiment, a display region is independent from a display depth.

In at least one example embodiment, the display region of the visual representation of the view is at least a portion of the display that is displaying the visual representation of the view, and the display region of the visual representation of the different view is at least a portion of the display that is displaying the visual representation of the different view.

In at least one example embodiment, the different view is a panoramic visual representation that further comprises visual information that is perceivable along another direction that bisects the direction and the different direction.

In at least one example embodiment, the panoramic visual representation further comprises visual information that is perceivable along the direction from the location.

One or more example embodiments further perform determination of a gaze depth of a user, and determination that the gaze depth corresponds with the different focal depth, wherein causation of display of the visual representation of the different view is based, at least in part, on the determination that the gaze depth corresponds with the different focal depth.

In at least one example embodiment, the causation of display of the visual representation of the different view on the display is performed such that the visual representation of the different view at least partially obscures the visual representation of the view on the display.

One or more example embodiments further perform causation of termination of display of the visual representation of the view on the display.

In at least one example embodiment, the causation of display of the visual representation of the different view is performed such that the visual representation of the different view is displayed at a display region on the display.

One or more example embodiments further perform determination of a gaze position of the user, and determination that the gaze position of the user corresponds with the display region of the visual representation of the different view on the display, wherein causation of display of the visual representation of the different view is based, at least in part, on the determination that the gaze position corresponds with the display region.

One or more example embodiments further perform determination of a gaze depth of a user, and determination that the gaze depth corresponds with the focal depth, wherein causation of display of the visual representation of the view is based, at least in part, on the determination that the gaze depth corresponds with the focal depth.

In at least one example embodiment, the causation of display of the visual representation of the view on the display is performed such that the visual representation of the view at least partially obscures the visual representation of the different view on the display.

One or more example embodiments further perform causation of termination of display of the visual representation of the different view on the display.

In at least one example embodiment, the causation of display of the visual representation of the view is performed such that the visual representation of the view is displayed at a display region on the display.

One or more example embodiments further perform determination of a gaze position of the user, and determination that the gaze position of the user corresponds with the display region of the visual representation of the view on the display, wherein causation of display of the visual representation of the view is based, at least in part, on the determination that the gaze position corresponds with the display region.

In at least one example embodiment, the display is a multiple depth display, causation of display of the visual representation of the view on the display is performed such that the focal depth corresponds with a display depth, and causation of display of the visual representation of the different view on the display is performed such that the different focal depth corresponds with a different display depth.

One or more example embodiments further perform receipt of information identifying a geographic location as the location, wherein the determination of the view comprises retrieval of an image that represents a view from the geographic location that has an orientation that corresponds with the direction and determination of the different view comprises retrieval of a different image that represents a different view from the geographic location that has a different orientation that corresponds with the different direction.

In at least one example embodiment, the image is a portion of a panoramic image, and the different image is a different portion of the panoramic image.

In at least one example embodiment, the location is a geographic location of the apparatus, determination of the view from the location comprises determination of the view from the geographic location of the apparatus, and determination of the different view from the location comprises determination of the different view from the geographic location of the apparatus.

In at least one example embodiment, the location is a geographic location of the user, determination of the view from the location comprises determination of the view from the geographic location of the user, and determination of the different view from the location comprises determination of the different view from the geographic location of the user.

In at least one example embodiment, the location is a geographic location of a separate apparatus caused to display the visual representation of the view and the visual representation of the different view.

In at least one example embodiment, the location is a location of the apparatus, determination of the view from the location comprises determination of the view from the location of the apparatus, and determination of the different view from the location comprises determination of the different view from the location of the apparatus.

In at least one example embodiment, the focal depth is configured such that when a user focuses on the visual representation of the view at the focal depth, the user avoids focusing on the visual representation of the different view at the different focal depth.

In at least one example embodiment, the focal depth is configured such that focus upon the visual representation of the view at the focal depth precludes focus upon the visual representation of the different view at the different focal depth.

In at least one example embodiment, the different focal depth is configured such that when a user focuses on the visual representation of the different view at the different focal depth, the user avoids focusing on the visual representation of the view at the focal depth.

In at least one example embodiment, the different focal depth is configured such that focus upon the visual representation of the different view at the different focal depth precludes focus upon the visual representation of the view at the focal depth.

In at least one example embodiment, wherein the visual information that is perceivable along the direction extending from the location is visual information that is within a capture region of a camera module oriented such that the capture region points in the direction from the location.

In at least one example embodiment, the visual information that is perceivable along the different direction extending from the location is visual information that is within a capture region of a camera module oriented such that the capture region points in the different direction from the location.

In at least one example embodiment, the causation of display of the visual representation of the view on the display comprises display of the visual representation of the view on the display.

In at least one example embodiment, the causation of display of the visual representation of the view on the display comprises sending of information indicative of the visual representation of the view to a separate apparatus, and causing display of the visual representation of the view on the display by the separate apparatus.

In at least one example embodiment, the visual representation of the view comprises a panoramic visual representation of at least a portion of the visual information that is perceivable along the direction extending from the location.

In at least one example embodiment, the visual representation of the view further comprises a visual representation of at least a portion of the visual information that is perceivable along the different direction extending from the location.

In at least one example embodiment, the visual representation of the different view comprises a panoramic visual representation of at least a portion of the visual information that is perceivable along the different direction extending from the location.

In at least one example embodiment, the visual representation of the different view further comprises a visual representation of at least a portion of the visual information that is perceivable along the direction extending from the location.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
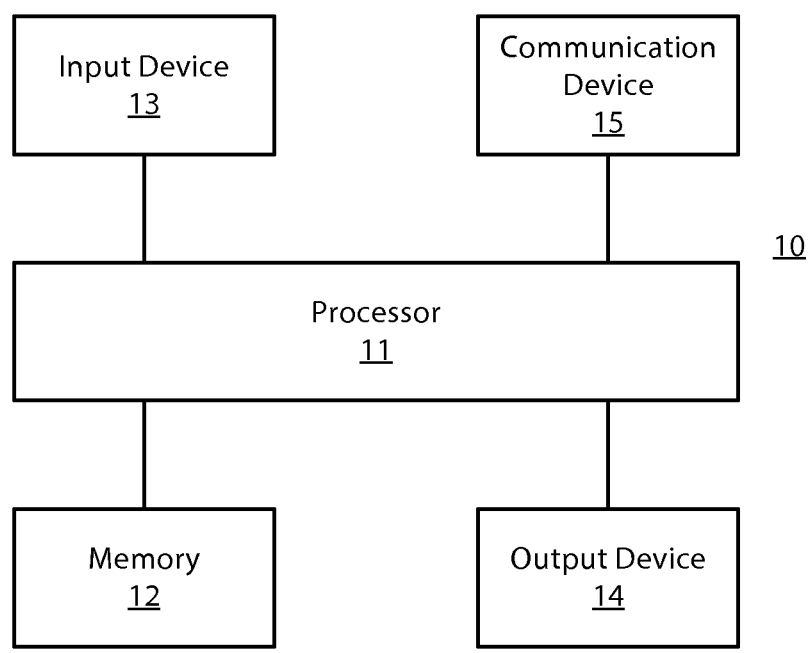
FIG. 1 is a block diagram showing an apparatus according to at least one example embodiment.

An embodiment of the invention and its potential advantages are understood by referring to FIGS. 1 through 8 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
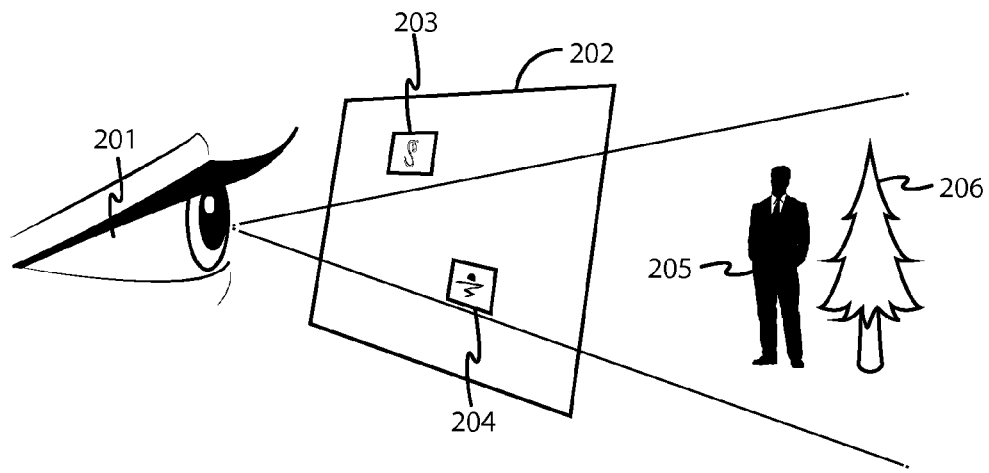
FIGS. 2A-2B are diagrams illustrating see through displays according to at least one example embodiment.
Figure 2B:
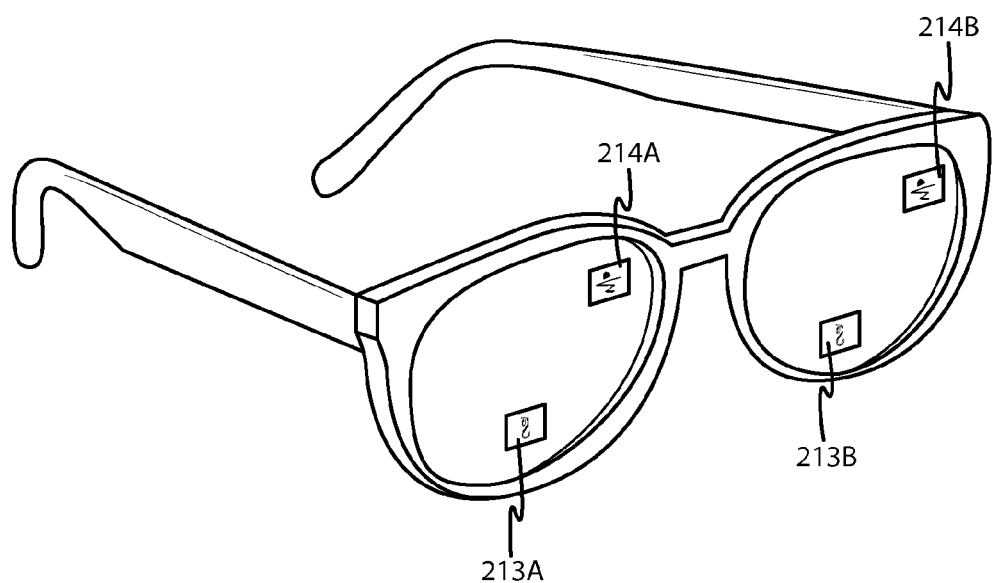

FIGS. 2A-2B are diagrams illustrating see through displays according to at least one example embodiment. The examples of FIGS. 2A-2B are merely examples and do not limit the scope of the claims. For example, configuration of the see through display may vary, relationship between the user and the see through display may vary, shape of the see through display may vary, opacity of the see through display may vary, and/or the like.

In modern times, electronic apparatuses are becoming more prevalent and pervasive. Users often utilize such apparatuses for a variety of purposes. For example, a user may utilize an apparatus to view information that is displayed on a display of the apparatus, to perceive information associated with the user's surroundings on the display of the apparatus, and/or the like. In many circumstances, a user may desire to view information associated with an apparatus in a way that is noninvasive, nonintrusive, discreet, and/or the like. In such circumstances, it may be desirable for a display to be a see through display. In at least one example embodiment, a see through display is a display that presents information to a user, but through which objects on an opposite side of the display from the user may be seen. A see through display may be comprised by a window, a windshield, a visor, glasses, a head mounted display, and/or the like. In at least one example embodiment, an apparatus is a head mounted display. A head mounted display may, for example, be a display that is head mountable, a display that is coupled to an element that wearable at a location on and/or proximate to the head of a user, a display that is wearable at a location on and/or proximate to the head of a user, and/or the like.

In some circumstances, it may be desirable for a display to preclude a user from seeing objects that may be positioned beyond the display. For example, a user may prefer to have information displayed on a solid display, have information displayed against a solid background, to avoid distractions that may be associated with perception of information on a see through display, and/or the like. In at least one example embodiment, a head mounted display may comprise an opaque display. An opaque display may be a display that is not a see through display, a display through which objects on an opposite side of the display may be obscured, and/or the like.

FIG. 2A is a diagram illustrating see through display 202 according to at least one example embodiment. In at least one example embodiment, displaying information on a see through display so that the information corresponds with one or more objects viewable through the see through display is referred to as augmented reality. In the example of FIG. 2A, user 201 may perceive objects 205 and 206 through see through display 202. In at least one example embodiment, the see through display may display information to the user. For example, display 202 may display information 203 and information 204. Information 203 and information 204 may be positioned on display 202 such that the information corresponds with one or more objects viewable through see through display 202, such as object 205. In such an example, information 203 may be associated with, identify, and/or the like, object 205. For example, information 203 may indicate an identity of object 205. In at least one example embodiment, display 202 may be comprised by a head mounted display.

FIG. 2B is a diagram illustrating a see through display according to at least one example embodiment. In at least one example embodiment, a see through display is a near eye display. A near eye display may be a see through display that is positioned proximate to an eye of the user. The example of FIG. 2B illustrates glasses that comprise a near eye display in each lens. In the example of FIG. 2B, the right near eye display is displaying information 213A and 214A, and the left near eye display is displaying information 213B and 214B. In at least one example embodiment, information 213A may be associated with information 213B. For example, the content of information 213A may be identical to content of information 213B. In some circumstances, even though the content may be identical between 213A and 213B, position of information 213A on the right near eye display may vary from position of information 213B on the left near eye display. In this manner, the apparatus may vary position of information between the left near eye display and right near eye display to vary the parallax of the information perceived by the user. In this manner, the apparatus may vary the perceived depth of the information by the user.

Figure 3A:
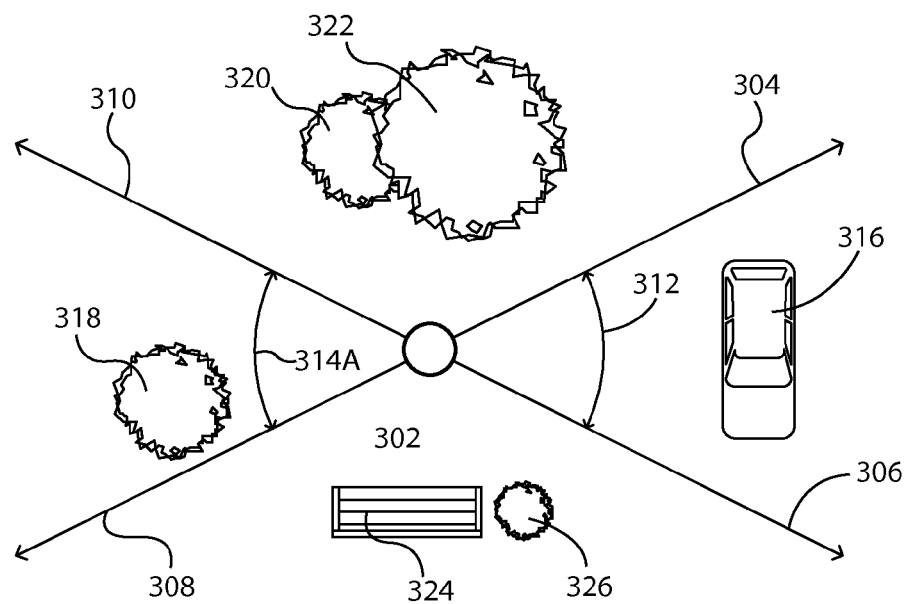
FIGS. 3A-3B are diagrams illustrating views from a locations according to at least one example embodiment.
Figure 3B:
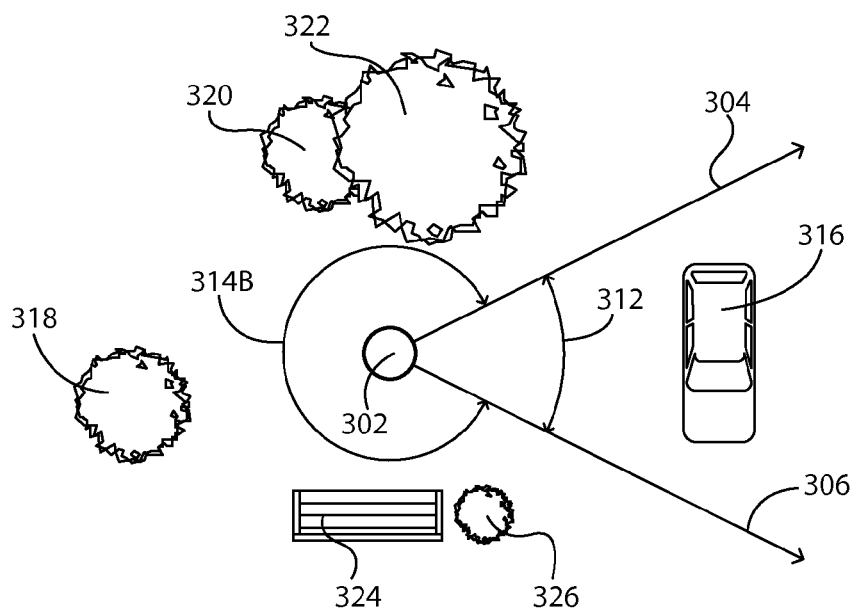

FIGS. 3A-3B are diagrams illustrating views from a locations according to at least one example embodiment. The examples of FIGS. 3A-3B are merely examples and do not limit the scope of the claims. For example, views may vary, location may vary, directions may vary, and/or the like.

In many circumstances, a user may desire to utilize an electronic apparatus in order to facilitate perception of a specific environment. For example, the user may desire to utilize the electronic apparatus to facilitate perception of visual information associated with the user's surroundings, visual information associated with a specific location, and/or the like. For example, a user riding a bicycle may desire to perceive visual information associated with the environment behind the user, to the side of the user, to the front of the user, and/or the like. In such an example, the visual information may be desirable for reasons associated with safety, environmental awareness, and/or the like.

In at least one example embodiment, an apparatus determines a view from a location. The view may comprise visual information that is perceivable along a direction extending from the location, a different direction extending from the location, and/or the like. The location may be a location of the apparatus, a location of a user of the apparatus, a geographic location of the apparatus, a location of a separate apparatus, and/or the like. For example, in FIG. 3A, location 302 is the location of an apparatus. In the example of FIG. 3A, view 312 is in a direction that is bound by view boundary 304 and 306. For example, view 312 may be a view that is in front of location 302. In the example of FIG. 3A, vehicle 316 is within view 312 and is perceivable along the direction extending from location 302.

In at least one example embodiment, an apparatus receives camera visual information that is perceivable along a direction from a camera module. The camera module may be comprised by the apparatus, a separate apparatus, a camera module apparatus worn by a user, a camera module apparatus mounted to a vehicle, and/or the like. For example, the camera module may be comprised by a head mounted display worn by a user, the camera module may be a camera module apparatus that is mounted to a car, a robot, an aerial vehicle, a bicycle, etc., and/or the like. In at least one example embodiment, determination of a view may be based, at least in part, on the camera visual information received from the camera module. The visual information that is perceivable along the direction extending from the location may be visual information that is within a capture region of a camera module. For example, the camera module may be oriented such that the capture region points in the direction from the location. In such an example, the capture region of the camera module may be bound, at least in part, by a view boundary. As such, the capture region of the camera module may be defined by a set of view boundaries. For example, in FIG. 3A, the apparatus at location may comprise a camera module. In the example of FIG. 3A, view boundary 304 and 306 indicate a capture region of the camera module. For example, view 312 may comprise visual information associated with a portion of the environment surrounding location 302 that is perceivable along a direction extending from location 302 that is within the capture region of the camera module. In the example of FIG. 3A, vehicle 316 is within view 312 and, thus, within the capture region of the camera module.

In order to facilitate perception of an environment surrounding a specific location, it may be desirable to permit a user to perceive more than one view associated with the location. In at least one example embodiment, an apparatus receives camera visual information from a camera module that is perceivable along a direction from a location, and receives different camera visual information from a different camera module that is perceivable along a different direction from a location. In such an example embodiment, determination of the view may be based, at least in part, on the camera visual information, and determination of the different view may be based, at least in part, on the different camera visual information. In such an example embodiment, the camera module may be oriented such that a capture region of the camera module points in the direction from the location, and the different camera module may be oriented such that a capture region of the different camera module points in the different direction from the location. In at least one example embodiment, an apparatus receives camera visual information that is perceivable along a direction from a location and along a different direction from the location from a camera module. For example, the camera module may be configured such that a capture region of the camera module corresponds with both the direction and the different direction. For example, the camera module may capture panoramic visual information that comprises visual information that is perceivable along the direction from the location and along the different direction from the location. For example, as depicted in FIG. 3A, view 312 is a portion of the environment surrounding location 302 in a direction extending from location 302, and view 314A is a different portion of the environment surrounding location 302 in a different direction extending from location 302. In the example of FIG. 3A, view 314A is a portion of the environment surrounding location 302 bound by view boundary 308 and 310 that is perceivable along the different direction extending from location 302 that is within a capture region of a camera module. In the example of FIG. 3A, tree 318 is within view 314A and, thus, within the capture region of the camera module. In at least one example embodiment, view 312 is associated with a camera module, and view 314A is associated with a different camera module.

In at least one example embodiment, a location is a location of an apparatus. In such an example embodiment, determination of a view from the location comprises determination of the view from the location of the apparatus. In such an example embodiment, determination of a different view from the location comprises determination of the different view from the location of the apparatus. For example, an apparatus may be a head mounted display worn on a user's head. The head mounted display may, for example, comprise a camera module oriented such that the camera module faces in a direction and a different camera module oriented such that the different camera module faces in a different direction. In such an example, the apparatus may determine the view in the direction extending from the location of the camera module worn at a location on the user's head, and determine the different view in the different direction extending from the location of the different camera module worn at a location on the user's head.

In at least one example embodiment, a location is a geographic location of a separate apparatus. In such an example embodiment, determination of a view from the location comprises determination of the view from the geographic location of the separate apparatus, and determination of a different view from the location comprises determination of the different view from the geographic location of the separate apparatus. For example, the separate apparatus may be located at a specific geographic location, and may comprise a camera module, a different camera module, and/or the like. The camera module may be oriented such that the camera module faces in a direction extending from the geographic location and the different camera module may be oriented such that the different camera module faces in a different direction extending from the geographic location. In such an example, an apparatus may determine the view in the direction extending from the location of the camera module comprised by the separate apparatus at the geographic location. In such an example embodiment, the apparatus may determine the different view in the different direction extending from the location of the different camera module comprised by the separate apparatus at the geographic location.

In order to facilitate determination of a view from a geographic location of a separate apparatus, it may be desirable to communicate information associated with the geographic location, information associated with one or more views from the geographic location, and/or the like. For example, a user may desire to perceive an environment surrounding a specific geographic location. In such an example embodiment, the user may desire to, for example, explore the environment surrounding the geographic location by way of viewing one or more visual representations of views that comprise visual information from the geographic location. In at least one example embodiment, an apparatus receives information identifying a geographic location as the location. In at least one example embodiment, determination of a view may comprise retrieval of an image that represents the view extending from the geographic location in a specific direction. The image may, for example, have an orientation that corresponds with the direction. In such an example embodiment, determination of a different view may comprise retrieval of a different image that represents the different view extending from the geographic location in a different direction. The different image may, for example, have a different orientation that corresponds with the different direction. In some circumstances, the image and the different image may be comprised by a panoramic image. A panoramic image may be an image that comprises visual information associated with the direction, the different direction, and/or the like. In at least one example embodiment, the image is a portion of a panoramic image, and the different image is a different portion of the panoramic image. For example, the panoramic image may be a spherical panoramic image, captured at a location, which comprises visual information associated with a full 180-degree vertical viewing range and a full 360-degree horizontal viewing range from the location. In such an example, a view from the location may be determined based, at least in part, on a portion of the spherical panoramic image that corresponds with the direction of the view, and a different view from the location may be determined based, at least in part, on a different portion of the spherical panoramic image that corresponds with the different direction of the different view.

In some circumstances, a user may desire to perceive a view from a location and a view from a different location. For example, the user may desire to perceive a view from a geographic location, perceive a different view from a different geographic location, and/or the like. In such an example embodiment, determination of a view from the location comprises determination of the view from the geographic location of the separate apparatus, and determination of a different view from a different location comprises determination of the different view from a different geographic location of a different separate apparatus. For example, the separate apparatus may be located at a specific geographic location, and may comprise a camera module. The different separate apparatus may be located at a different specific geographic location, and may comprise a different camera module. The camera module may be oriented such that the camera module faces in a direction extending from the geographic location, and the different camera module may be oriented such that the different camera module faces in a different direction extending from the different geographic location. In such an example, an apparatus may determine the view in the direction extending from the location of the camera module comprised by the separate apparatus at the geographic location. In such an example embodiment, the apparatus may determine the different view in the different direction extending from the different location of the different camera module comprised by the different separate apparatus at the different geographic location.

FIG. 3A is a diagram illustrating views from a location according to at least one example embodiment. In the example of FIG. 3A, view 312 comprises visual information associated with a portion of the environment surrounding location 302 that is bounded by view boundary 304 and 306. In the example of FIG. 3A, view boundary 304 and 306 indicate a capture region of a camera module that is at location 302 and that is oriented in the direction of view 312. The direction of a view may be a direction that bisects an angle between the view boundaries of the view. For example, the direction of view 312 is a direction that bisects the angle between view boundaries 304 and 306. For example, view 312 may comprise visual information associated with a portion of the environment surrounding location 302 that is perceivable along the direction of view 312 from location 302 and that is within the capture region of the camera module. In the example of FIG. 3A, vehicle 316 is within view 312 and, thus, within the capture region of the camera module. In the example of FIG. 3A, view 314A comprises visual information associated with a portion of the environment surrounding location 302 that is bounded by view boundary 308 and 310. In the example of FIG. 3A, view boundary 308 and 310 indicate a different capture region of a different camera module that is at location 302 and that is oriented in the direction of view 314A. For example, view 314A may comprise visual information associated with a portion of the environment surrounding location 302 that is perceivable along the direction of view 314A from location 302 and that is within the different capture region of the different camera module. In the example of FIG. 3A, tree 318 is within view 314A and, thus, within the capture region of the different camera module. In at least one example embodiment, view 312 determined based, at least in part, on a portion of a panoramic image captured at location 302, and view 314A is determined based, at least in part, on a different portion of the panoramic image.

In the example of FIG. 3A, trees 320, 322, and 326, and bench 324, fail to correspond with a capture region of a camera module at location 302. In order to better facilitate perception of an environment surrounding a specific location, it may be desirable to permit a user to perceive visual information that may be perceivable along many different directions from the location. For example, it may be desirable to permit the user to perceive visual information along a direction, along a different direction, along another direction that bisects the direction and the different direction, and/or the like, from the location. For example, visual information that may be perceivable along many different directions may be stitched together such that a panoramic visual representation comprises visual information along a 180-degree horizontal viewing range, a 210-degree horizontal viewing range, a 360-degree horizontal viewing range, and/or the like, from the location.

FIG. 3B is a diagram illustrating views from a location according to at least one example embodiment. In the example of FIG. 3B, view 312 corresponds with view 312 of FIG. 3A. In the example of FIG. 3B, view 314B is a reconfiguration of view 314A of FIG. 3A such that view 314B is configured to be bound by view boundary 304 and 306. In this manner, view 312 and view 314B collectively comprise visual information perceivable along a 360-degree horizontal viewing range from location 302. In the example of FIG. 3B, view 312 comprises visual information associated with a capture region of a camera module that is at location 302 and that is oriented in the direction of view 312. In the example of FIG. 3B, view 314B comprises visual information associated with a different capture region of a different camera module that is at location 302 and that is oriented in the direction of view 314B. For example, view 314B may comprise visual information associated with a portion of the environment surrounding location 302 that is perceivable along the direction of view 314B from location 302 and that is within the different capture region of the different camera module. In the example of FIG. 3B, trees 318, 320, 322, and 326, and bench 324 are within view 314B and, thus, within the capture region of the different camera module. In at least one example embodiment, view 312 determined based, at least in part, on a portion of a panoramic image captured at location 302, and view 314B is determined based, at least in part, on a different portion of the panoramic image.

Although the example of FIGS. 3A-3B depict discrete and independent views, in some circumstances, a view and a different view may, at least partially, overlap. For example, view 314B may comprise visual information perceivable along a 360-degree horizontal viewing range. In such an example, view 314B may comprise a portion of the visual information comprised by view 312, an entirety of the visual information comprised by view 312, and/or the like. For example, view 314B may comprise visual information associated with trees 318, 320, 322, and 326, and bench 324, as well as vehicle 316. As such, view 314B may comprise panoramic visual information that is perceivable across the 360-degree horizontal viewing range from location 302.

FIGS. 4A-4G are diagrams illustrating display of visual representations according to at least one example embodiment. The examples of FIGS. 4A-4G are merely examples and do not limit the scope of the claims. For example, views may vary, visual representations may vary, gaze depth and/or focal depth may vary, display configuration may vary, and/or the like.

In many circumstances, in order to facilitate perception of an environment surrounding a location, a user may desire to view a representation of visual information associated with a view, a different view, and/or the like. For example, the user may desire to perceive the view, the different view, etc. by way of a head mounted display. In at least one example embodiment, an apparatus causes display of a visual representation of a view on a display. For example, the apparatus may display the visual representation of the view on a display comprised by the apparatus, may send information indicative of the visual representation of the view to a separate apparatus for display, may cause a separate apparatus to display the visual representation of the view, and/or the like.

In many circumstances, a user may desire to perceive the view, the different view, and/or the like in such a way that permits the user to easily and quickly switch from the view to the different view, from the different view to the view, and/or the like. For example, a user at a location may desire to perceive objects surrounding the user, to perceive visual information associated with a view along a direction from the location, to perceive visual information associated with a different view along a different direction from the location, and/or the like. In such an example, the user may desire to interact with a head mounted display in such a way that avoids potentially cumbersome tactile interactions, avoids fumbling with the head mounted display, and/or the like.

In at least one example embodiment, an apparatus causes display of a visual representation of a view on a display such that the view is viewable by a user at a focal depth, and causes display of a visual representation of a different view on the display such that the different view is viewable by the user at a different focal depth. In such an example embodiment, the focal depth may be configured such that when the user focuses on the visual representation of the view at the focal depth, the user avoids focusing on the visual representation of the different view at the different focal depth. For example, the focal depth may be configured such that focus upon the visual representation of the view at the focal depth precludes focus upon the visual representation of the different view at the different focal depth. Similarly, the different focal depth may be configured such that when a user focuses on the visual representation of the different view at the different focal depth, the user avoids focusing on the visual representation of the view at the focal depth. For example, the different focal depth may be configured such that focus upon the visual representation of the different view at the different focal depth precludes focus upon the visual representation of the view at the focal depth. As such, if a user focuses on a visual representation that is at a focal depth, the user is able to focus on the visual representation and is unable to focus on a different visual representation that is displayed at a significantly greater focal depth, a significantly lesser focal depth, and/or the like. For example, a user that desires to view a visual representation of a view may focus at a depth that corresponds with the focal depth of the visual representation of the view. Similarly, for example, a user that desires to view a visual representation of a different view may focus at a depth that corresponds with the different focal depth of the visual representation of the different view.

In some circumstances, a user may desire to perceive views from more than one location. For example, a user may desire to perceive a view from a location, a different view from the location, a third view from a different location, and/or the like. In at least one example embodiment, an apparatus causes display of a visual representation of a view on a display such that the view is viewable by a user at a focal depth, causes display of a visual representation of a different view on the display such that the different view is viewable by the user at a different focal depth, and causes display of a visual representation of a third view on the display such that the third view is viewable by the user at a third focal depth.

In at least one example embodiment, a display is a multiple depth display. In such an example embodiment, an apparatus may cause display of a visual representation of a view on the display such that a focal depth corresponds with a display depth, cause display of a visual representation of a different view on the display such that a different focal depth corresponds with a different display depth, cause display of a visual representation of a third view on the display such that a third focal depth corresponds with a third display depth, and/or the like. For example, the display may be a stereo display that is capable of conveying information at a particular focal depth by way of stereopsis for binocular vision. In such an example, stereopsis allows for the perception of depth when a visual representation displayed on the stereo display is viewed by a user with normal binocular vision.

In some circumstances, it may be desirable to determine an intent from a user based, at least in part, on a gaze depth of the user. For example, it may be desirable to cause display of a visual representation of a view when a user desires to perceive such a visual representation. In such an example, the user's gaze depth may correspond with a focal depth of the visual representation of the view. Correspondence between the user's gaze depth and the focal depth of the visual representation of the view may indicate that the user desires to perceive the visual representation of the view. In at least one example embodiment, an apparatus determines a gaze depth of a user. In at least one example embodiment, an apparatus determines that a gaze depth of a user corresponds with the focal depth associated with a view, a visual representation of a view, and/or the like. In such an example embodiment, the apparatus may cause display of the visual representation of the view at the focal depth based, at least in part, on the determination that the gaze depth of the user corresponds with the focal depth. In at least one example embodiment, an apparatus determines that a gaze depth of a user corresponds with the different focal depth associated with a different view, a visual representation of a different view, and/or the like. In such an example embodiment, the apparatus may cause display of the visual representation of the different view at the different focal depth based, at least in part, on the determination that the gaze depth of the user corresponds with the different focal depth.

Figure 4A:
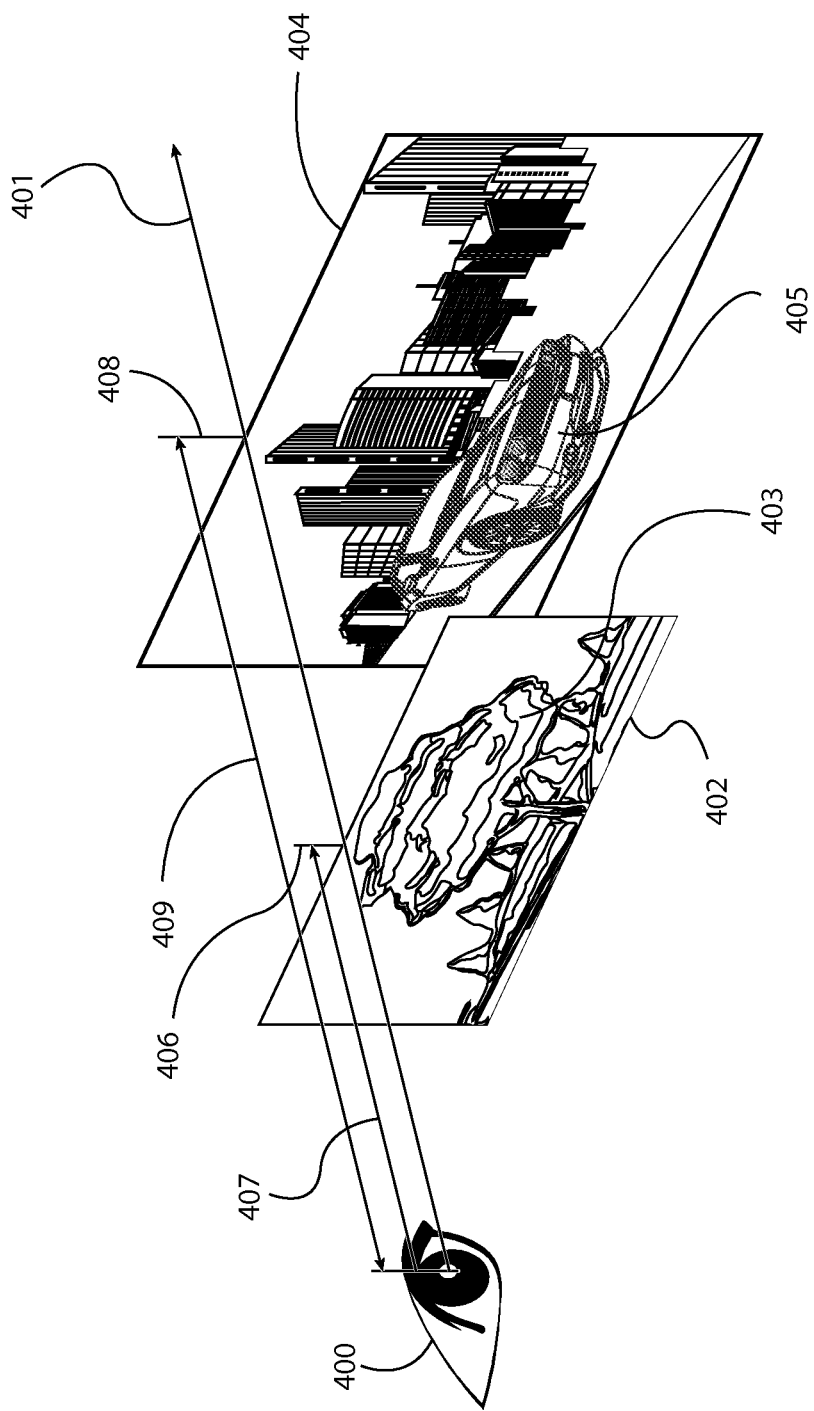
FIGS. 4A-4G are diagrams illustrating display of visual representations according to at least one example embodiment.

FIG. 4A is a diagram illustrating display of visual representations according to at least one example embodiment. In the example of FIG. 4A, visual representation 402 is a visual representation of view 314A of FIG. 3A. In the example of FIG. 4A, visual representation 403 comprises visual information associated with a view in a direction that is behind user 400. For example, tree 403 corresponds with tree 318 of FIG. 3A. In this manner, visual representation 403 comprises visual information that is perceivable along a direction that bisects the angle between view boundary 308 and 310 extending from location 302 of FIG. 3A. In the example of FIG. 4A, visual representation 403 is associated with focal depth 406. Focal depth 406 is a depth of focus associated with a user focusing upon a point that is position at a distance 407 from user 400. Visual representation 402 may be based, at least in part, on camera visual information received from a camera module that is oriented in the direction associated with the portion of the environment depicted in visual representation 402. Alternatively, visual representation 402 may be based, at least in part, on a portion of a panoramic image depicting the environment surrounding a geographic location associated with location 302 of FIG. 3A. For example, visual representation 402 may be based on the portion of the panoramic image corresponding with the direction of view 314A of FIG. 3A.

In the example of FIG. 4A, visual representation 404 is a visual representation of view 312 of FIG. 3A. In the example of FIG. 4A, visual representation 405 comprises visual information associated with a view in a direction that is in front of user 400. For example, vehicle 405 corresponds with vehicle 316 of FIG. 3A. In this manner, visual representation 405 comprises visual information that is perceivable along a direction that bisects the angle between view boundary 304 and 306 extending from location 302 of FIG. 3A. In the example of FIG. 4A, visual representation 405 is associated with focal depth 408. Focal depth 408 is a depth of focus associated with a user focusing upon a point that is position at a distance 409 from user 400. Visual representation 404 may be based, at least in part, on camera visual information received from a camera module that is oriented in the direction associated with the portion of the environment depicted in visual representation 404. Alternatively, visual representation 404 may be based, at least in part, on a portion of a panoramic image depicting the environment surrounding a geographic location associated with location 302 of FIG. 3A. For example, visual representation 404 may be based on the portion of the panoramic image corresponding with the direction of view 312 of FIG. 3A.

In the example of FIG. 4A, an apparatus may cause display of visual representation 402 based, at least in part, on user 400 focusing at focal depth 406. Similarly, the an apparatus may cause display of visual representation 404 based, at least in part, on user 400 focusing at focal depth 408. Although the example of FIG. 4A depicts visual representation 402 being displayed at a focal depth that is less than a focal depth associated with visual representation 404, visual representation 402 may be displayed at a focal depth that is greater than a focal depth associated with visual representation 404.

In some circumstances, a user may desire to perceive a visual representation of a view based, at least in part, on fixation at a particular point on a display that corresponds with the visual representation of the view. For example, even though the user may be focused at an appropriate gaze depth to perceive the visual representation of the view, the user may be focused on a position that fails to correspond with the visual representation of the view. In such circumstances, there may be situations where the user may prefer to avoid seeing the visual representation of the view, despite correspondence between the user's gaze depth and the focal depth of the visual representation of the view. In at least one example embodiment, an apparatus causes display of a visual representation of a view such that the visual representation of the view is displayed at a display region on a display. In such an example embodiment, the apparatus may determine a gaze position of the user, and determine that the gaze position corresponds with the display region of the visual representation of the view on the display. The apparatus may cause display of the visual representation of the view based, at least in part, on the determination that the gaze position corresponds with the display region. Similarly, in at least one example embodiment, an apparatus causes display of a visual representation of a different view such that the visual representation of the different view is displayed at a different display region on a display. In such an example embodiment, the apparatus may determine a different gaze position of the user, and determine that the different gaze position corresponds with the different display region of the visual representation of the different view on the display. The apparatus may cause display of the visual representation of the different view based, at least in part, on the determination that the different gaze position corresponds with the different display region. For example, the display region of the visual representation of the view may be at least a portion of the display that is displaying the visual representation of the view, and the display region of the visual representation of the different view may be at least a portion of the display that is displaying the visual representation of the different view.

In some circumstances, display of visual representations of views may be constrained by display size, display resolution, and/or the like. In such circumstances, it may be desirable to display visual representations of views in such a way that reduces the effects of any display constraints that may be present, fully utilizes the available display space, and/or the like. In at least one example embodiment, display of a visual representation of a view is performed such that a display region of the visual representation of the view overlaps with a display region of a visual representation of a different view. In such an example embodiment, the overlap may be characterized by the display region of the visual representation of the view at least partially corresponding with the display region of the visual representation of the different view. For example, a visual representation of a view may be displayed in a display region that partially corresponds with a display region of a visual representation of a different view, wholly corresponds with the display region of the visual representation of the different view, and/or the like. For example, a visual representation of a view may be displayed in a display region and at a focal depth. In such an example, a visual representation of a different view may be displayed in the same display region and at a different focal depth. In this manner, both the visual representation of the view and the visual representation of the different view make use of the same display region of the display, and a user may selectively perceive either visual representation based, at least in part, on a gaze depth of the user corresponding with the focal depth, the different focal depth, and/or the like.

In at least one example embodiment, a display depth associated with display of a visual representation of a view on a display is independent from a display region in which the visual representation of the view is displayed on the display. For example, a display region associated with a visual representation of a view may, at least partially, correspond with a display region associated with a visual representation of a different view even if the visual representation of the view and the visual representation of the different view are displayed at different display depths on the display. In at least one example embodiment, a display region may be associated with more than one display depth, more than one visual representation of a view, and/or the like.

In at least one example embodiment, an apparatus causes display of a visual representation of a view on a display such that the visual representation of the view at least partially obscures a visual representation of a different view on the display. Similarly, an apparatus may cause display of a visual representation of a different view on a display such that the visual representation of the different view at least partially obscures a visual representation of a view on the display. For example, even though a user may focus at a gaze depth that corresponds with a focal depth associated with the visual representation of the view, the out of focus visual representation of the different view may, at least partially, obscure the visual representation of the view. In such an example, the obscurance may be characterized by a blurred perception of the visual representation of the different view, by display of a semi-transparent visual representation of the different view, by display of the visual representation of the different view in a display region that, at least partially, corresponds with a display region of the visual representation of the view, and/or the like.

In many circumstances, a user may desire to discontinue display of a visual representation of a view, to halt perception of the visual representation of the view, to perceive visual information that is positioned beyond a see through display of a head mounted display, and/or the like. In such circumstances, the user may desire an apparatus to terminate display of the visual representation of the view, for example, upon focusing at a focal depth that fails to correspond with the visual representation of the view, upon focusing upon an object that is positioned beyond a see through display of a head mounted display, and/or the like. In at least one example embodiment, an apparatus causes termination of display of a visual representation of the view on a display, causes termination of display of a visual representation of a different view on the display, and/or the like.

Figure 4B:
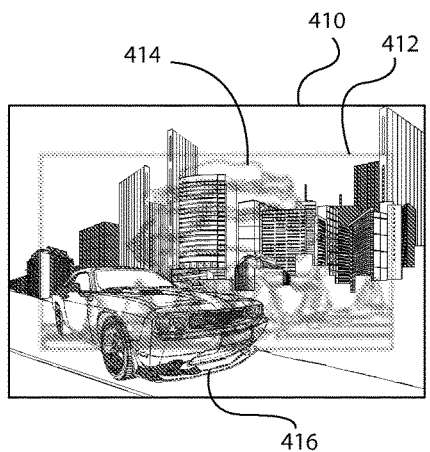

FIG. 4B is a diagram illustrating display of visual representations according to at least one example embodiment. In the example of FIG. 4B, visual representation 410 corresponds with visual representation 404 of FIG. 4A, and visual representation 412 corresponds with visual representation 402 of FIG. 4A. In the example of FIG. 4B, visual representation 410 comprises visual information that is perceivable along the direction of view 312 of FIG. 3A, and visual representation 412 comprises visual information that is perceivable along the direction of view 314A of FIG. 3A. As such, vehicle 416 corresponds with vehicle 316 of FIG. 3A, and tree 414 corresponds with tree 318 of FIG. 3A. As depicted in FIG. 3A and FIG. 4B, visual representation 410 comprises visual information perceivable along roughly a 60-degree horizontal viewing range centered about the direction of view 312 of FIG. 3A, and visual representation 412 comprises visual information perceivable along roughly a 60-degree horizontal viewing range centered about the direction of view 314A of FIG. 3A. As such, a user viewing the image of FIG. 4D may be presented with visual representations depicting a view in front of and behind the user, to the left and to the right of the user, and/or the like.

In the example of FIG. 4B, a display is displaying visual representation 410 at a focal depth and visual representation 412 at a different focal depth. The example of FIG. 4B depicts what a user whose gaze depth corresponds with the focal depth associated with visual representation 410 may perceive when viewing the display. The user's gaze depth corresponding with the focal depth associated with visual representation 410 may indicate that the user desires the user's apparatus to cause display of visual representation 410, that the user desires to perceive visual information associated with visual representation 410, that the user desired to bring visual representation 410 into focus, that the user desires to perceive visual information corresponding with a direction that is in front of the user, and/or the like.

As illustrated in FIG. 4B, the display region of visual representation 412 overlaps and partially obscures visual representation 410. In the example of FIG. 4B, visual representation 410 appears sharper and less blurred when compared to visual representation 412, as focusing upon visual representation 410 may preclude focusing upon visual representation 412. In this manner, visual representation 410 is displayed in a more prominent fashion while still enabling a user to perceive softened details depicted in visual representation 412, and thus allowing the user to remain aware of the user's surroundings, to detect movement associated with visual representation 412, and/or the like. In this manner, if the user desires to perceive visual representation 412, for example, if the user perceives movement with respect to visual representation 412 or desires to reference visual representation 412 to for purposes relating to environmental awareness, the user may quickly adjust the user's gaze depth to correspond with the focal depth of visual representation 412 such that visual representation 412 is displayed more prominently, thus enabling the user to further analyze visual representation 412, determine the source of the movement, and/or the like.

Figure 4D:
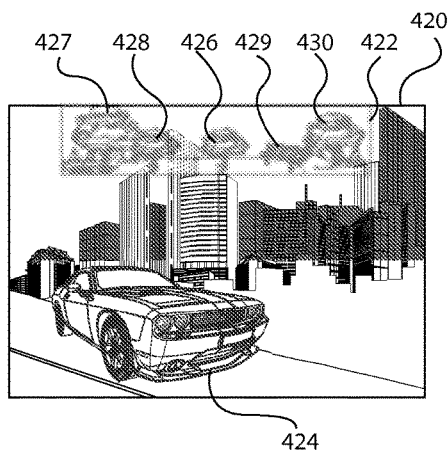
Figure 4C:
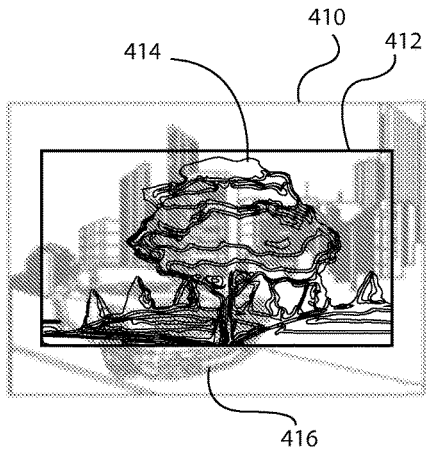

FIG. 4C is a diagram illustrating display of visual representations according to at least one example embodiment. FIG. 4C corresponds with FIG. 4B after a user has shifted her gaze depth from a gaze depth that corresponds with the focal depth of visual representation 410 and to a gaze depth that corresponds with the different focal depth of visual representation 412. The example of FIG. 4C depicts what a user whose gaze depth corresponds with the focal depth associated with visual representation 412 may perceive when viewing the display. The user's gaze depth corresponding with the focal depth associated with visual representation 412 may indicate that the user desires the user's apparatus to cause display of visual representation 412, that the user desires to perceive visual information associated with visual representation 412, that the user desired to bring visual representation 412 into focus, that the user desires to perceive visual information corresponding with a direction that is behind the user, and/or the like.

As illustrated in FIG. 4C, the display region of visual representation 410 overlaps and partially obscures visual representation 412. In the example of FIG. 4C, visual representation 412 appears sharper and less blurred when compared to visual representation 410, as focusing upon visual representation 412 may preclude focusing upon visual representation 410. In this manner, visual representation 412 is displayed in a more prominent fashion while still enabling a user to perceive softened details depicted in visual representation 410, and thus allowing the user to remain aware of the user's surroundings, to detect movement associated with visual representation 410, and/or the like. In this manner, if the user desires to perceive visual representation 410, for example, if the user perceives movement with respect to visual representation 410 or desires to reference visual representation 410 to for purposes relating to environmental awareness, the user may quickly adjust the user's gaze depth to correspond with the focal depth of visual representation 410 such that visual representation 410 is displayed more prominently, thus enabling the user to further analyze visual representation 410, determine the source of the movement, and/or the like.

As discussed previously, in some circumstances, it may be desirable to permit a user to perceive visual information that may be perceivable along many different directions from the location. For example, it may be desirable to permit the user to perceive visual information along a direction, along a different direction, along another direction that bisects the direction and the different direction, and/or the like, from the location. For example, in order to facilitate environmental awareness, a user facing in a direction and wearing a head mounted display may desire to perceive display of a panoramic visual representation that comprises visual information perceivable along a different direction that is opposite of the direction the user is facing, along a direction that bisects the direction and the different direction, and/or the like.

In at least one example embodiment, a view is a panoramic visual representation that comprises visual information that is perceivable along a direction from a location, a different direction from the location, another direction that bisects the direction and the different direction from the direction, and/or the like. For example, a visual representation of a view may comprise a panoramic visual representation of, at least a portion of, visual information that is perceivable along a direction extending from a location, visual information that is perceivable along the different direction extending from the location, visual information that is perceivable along another direction that bisects the direction and the different direction, and/or the like. In another example, a visual representation of a different view may comprise a panoramic visual representation of, at least a portion of, visual information that is perceivable along a different direction extending from the location, visual information that is perceivable along a direction extending from the location, visual information that is perceivable along another direction that bisects the direction and the different direction, and/or the like. In effect, the visual representations of the views may allow a user to perceive visual information perceivable in a direction that may otherwise be out of view of the user, behind the user, beyond the peripheral view of the user, and/or the like.

FIG. 4D is a diagram illustrating display of visual representations according to at least one example embodiment. In the example of FIG. 4D, visual representation 420 corresponds with visual representation 404 of FIG. 4A, and visual representation 422, at least partially, corresponds with visual representation 402 of FIG. 4A. In the example of FIG. 4D, visual representation 420 comprises visual information that is perceivable along the direction of view 312 of FIG. 3B, and visual representation 422 comprises visual information that is perceivable along the direction of view 314B of FIG. 3B. As such, vehicle 424 depicted in visual representation 420 corresponds with vehicle 316 of FIG. 3B. In the example of FIG. 4D, tree 426 depicted in visual representation 422 corresponds with tree 318 of FIG. 3B. Additionally, in the example of FIG. 4D, tree 427, tree 428, bench 429, and tree 430 correspond with tree 322, tree 320, bench 324, and tree 326 of FIG. 3B, respectively. In this manner, visual representation 422 is a panoramic visual representation that comprises visual information perceivable in the direction of view 314B of FIG. 3B, in another direction that bisects the direction of view 314B and view 312 of FIG. 3B, and/or the like. As depicted in FIG. 3B and FIG. 4D, visual representation 420 comprises visual information perceivable along roughly a 60-degree horizontal viewing range centered about the direction of view 312 of FIG. 3B, and visual representation 422 comprises visual information perceivable along roughly a 300-degree horizontal viewing range centered about the direction of view 314B of FIG. 3B. As such, a user viewing the image of FIG. 4D may be presented with a full 360-degree visual representation of the environment surrounding the user.

In the example of FIG. 4D, a display is displaying visual representation 420 at a focal depth and visual representation 422 at a different focal depth. The example of FIG. 4D depicts what a user whose gaze depth corresponds with the focal depth associated with visual representation 420 may perceive when viewing the display. The user's gaze depth corresponding with the focal depth associated with visual representation 420 may indicate that the user desires the user's apparatus to cause display of visual representation 420, that the user desires to perceive visual information associated with visual representation 420, that the user desired to bring visual representation 420 into focus, that the user desires to perceive visual information corresponding with a direction that is in front of the user, and/or the like. In the example of FIG. 4D, visual representation 420 is displayed on a display region of the see through display. The user's gaze position may, for example, correspond with a position within the display region of visual representation 420 such that a user intent to cause display of visual representation 444, to bring visual representation 420 into focus, and/or the like, may be inferred.

As illustrated in FIG. 4D, the display region of visual representation 422 overlaps and partially obscures visual representation 420. In the example of FIG. 4D, visual representation 420 appears sharper and less blurred when compared to visual representation 422, as focusing upon visual representation 420 may preclude focusing upon visual representation 422. In this manner, visual representation 420 is displayed in a more prominent fashion while still enabling a user to perceive softened details depicted in visual representation 422, and thus allowing the user to remain aware of the user's surroundings, to detect movement associated with visual representation 422, and/or the like. In this manner, if the user desires to perceive visual representation 422, for example, if the user perceives movement with respect to visual representation 422 or desires to reference visual representation 422 to for purposes relating to environmental awareness, the user may quickly adjust the user's gaze depth to correspond with the focal depth of visual representation 422 such that visual representation 422 is displayed more prominently, thus enabling the user to further analyze visual representation 422, determine the source of the movement, and/or the like.

Figure 4E:
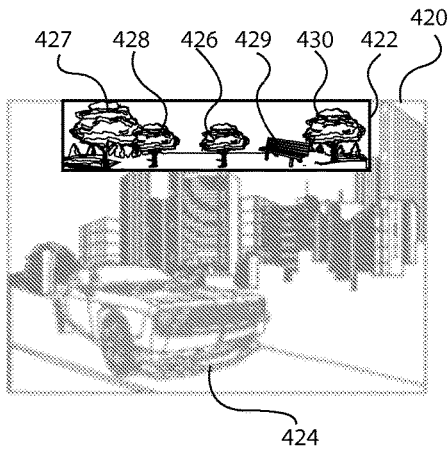

FIG. 4E is a diagram illustrating display of visual representations according to at least one example embodiment. FIG. 4E corresponds with FIG. 4D after a user has shifted her gaze depth from a gaze depth that corresponds with the focal depth of visual representation 420 and to a gaze depth that corresponds with the different focal depth of visual representation 422. The example of FIG. 4E depicts what a user whose gaze depth corresponds with the focal depth associated with visual representation 422 may perceive when viewing the display. The user's gaze depth corresponding with the focal depth associated with visual representation 422 may indicate that the user desires the user's apparatus to cause display of visual representation 422, that the user desires to perceive visual information associated with visual representation 422, that the user desired to bring visual representation 422 into focus, that the user desires to perceive visual information corresponding with a direction that is behind the user, and/or the like. In the example of FIG. 4E, visual representation 422 is displayed on a display region of the see through display. The user's gaze position may, for example, correspond with a position within the display region of visual representation 422 such that a user intent to cause display of visual representation 422, to bring visual representation 422 into focus, and/or the like, may be inferred.

As illustrated in FIG. 4E, the display region of visual representation 420 overlaps and partially obscures visual representation 422. In the example of FIG. 4E, visual representation 422 appears sharper and less blurred when compared to visual representation 420, as focusing upon visual representation 422 may preclude focusing upon visual representation 420. In this manner, visual representation 422 is displayed in a more prominent fashion while still enabling a user to perceive softened details depicted in visual representation 420, and thus allowing the user to remain aware of the user's surroundings, to detect movement associated with visual representation 420, and/or the like. In this manner, if the user desires to perceive visual representation 420, for example, if the user perceives movement with respect to visual representation 420 or desires to reference visual representation 420 to for purposes relating to environmental awareness, the user may quickly adjust the user's gaze depth to correspond with the focal depth of visual representation 420 such that visual representation 420 is displayed more prominently, thus enabling the user to further analyze visual representation 420, determine the source of the movement, and/or the like.

In some circumstances, a user may desire to view information on a see through display, as described regarding FIGS. 2A-2B. For example, the user may desire to view information that is displayed on a head mounted display while reducing obscuration of the environment surrounding the user. In such circumstances, visual information that is perceivable along a direction from the user may be directly perceivable by the user through the see through display. For example, the user may perceive visual information that is in front of the user through at least a portion of a head mounted display. As such, in some circumstances, the user may desire to perceive at least a portion of the visual information that is perceivable in front of the user in such a way that enhances the visual information, provides additional visual information beyond what may be perceivable by the user through the head mounted display, and/or the like. In at least one example embodiment, the display is a see-through display, and the view is visual information indicative of a non-unitary magnification of visual information that is perceivable along the direction from the location. Non-unitary magnification, for example, may be a magnification factor other than 1. For example, the visual representation of the view may comprise a 10× magnification of at least a portion of the visual information that is perceivable along the direction from the location, may comprise a 20× magnification of a different portion of the visual information that is perceivable along the direction from the location, and/or the like.

Figure 4F:
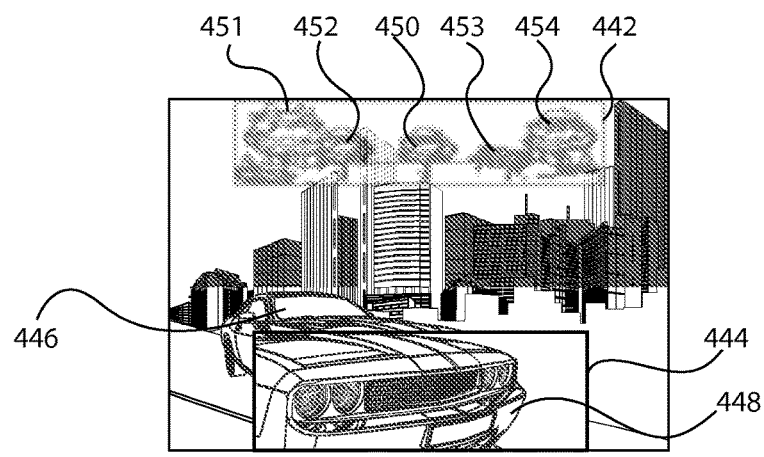

FIG. 4F is a diagram illustrating display of visual representations according to at least one example embodiment. In the example of FIG. 4F, vehicle 446 is perceivable through a see through display that is displaying visual representations 442 and 444. The example of FIG. 4F corresponds with the example of FIG. 3B. As such, vehicle 446 that is perceivable through the see through display corresponds with vehicle 316 of FIG. 3B. In the example of FIG. 4F, visual representation 444 comprises visual information indicative of a non-unitary magnification of visual information that is perceivable along the direction of view 312 of FIG. 3B from the location. For example, as depicted in FIG. 3B, a user may be at location 302 and may be facing vehicle 316. As such, vehicle 448 depicted in visual representation 444 corresponds with vehicle 316 of FIG. 3B. The example of FIG. 4F depicts what a user may perceive while standing at location 302 of FIG. 3B and while looking toward vehicle 316 of FIG. 3B. In the example of FIG. 4F, visual representation 442, at least partially, corresponds with visual representation 402 of FIG. 4A. In the example of FIG. 4F, visual representation 442 comprises visual information that is perceivable along the direction of view 314B of FIG. 3B. As such, tree 450 depicted in visual representation 442 corresponds with tree 318 of FIG. 3B. Additionally, in the example of FIG. 4F, tree 451, tree 452, bench 453, and tree 454 correspond with tree 322, tree 320, bench 324, and tree 326 of FIG. 3B, respectively. In this manner, visual representation 442 is a panoramic visual representation that comprises visual information perceivable in the direction of view 314B of FIG. 3B, in another direction that bisects the direction of view 314B and view 312 of FIG. 3B, and/or the like. As depicted in FIG. 3B and FIG. 4F, visual representation 422 comprises visual information perceivable along roughly a 300-degree horizontal viewing range centered about the direction of view 314B of FIG. 3B. As such, a user viewing the image of FIG. 4F may be presented with a full 360-degree visual representation of the environment surrounding the user.

In the example of FIG. 4F, a display is displaying visual representation 444 at a focal depth and visual representation 442 at a different focal depth. The example of FIG. 4F depicts what a user whose gaze depth corresponds with the focal depth associated with visual representation 444 may perceive when viewing the display. The user's gaze depth corresponding with the focal depth associated with visual representation 444 may indicate that the user desires the user's apparatus to cause display of visual representation 444, that the user desires to perceive visual information associated with visual representation 444, that the user desired to bring visual representation 444 into focus, that the user desires to perceive a non-unitary magnification of visual information corresponding with a direction that is in front of the user, and/or the like. In the example of FIG. 4F, visual representation 444 is displayed on a display region of the see through display. The user's gaze position may, for example, correspond with a position within the display region of visual representation 444 such that a user intent to cause display of visual representation 444, to bring visual representation 444 into focus, and/or the like, may be inferred.

In the example of FIG. 4F, visual representation 444 appears sharper and less blurred when compared to visual representation 442, as focusing upon visual representation 444 may preclude focusing upon visual representation 442. In this manner, visual representation 444 is displayed in a more prominent fashion while still enabling a user to perceive softened details depicted in visual representation 442, and thus allowing the user to remain aware of the user's surroundings, to detect movement associated with visual representation 442, and/or the like. In this manner, if the user desires to perceive visual representation 442, for example, if the user perceives movement with respect to visual representation 442 or desires to reference visual representation 442 to for purposes relating to environmental awareness, the user may quickly adjust the user's gaze depth to correspond with the focal depth of visual representation 442 such that visual representation 442 is displayed more prominently, thus enabling the user to further analyze visual representation 442, determine the source of the movement, and/or the like.

Figure 4G:
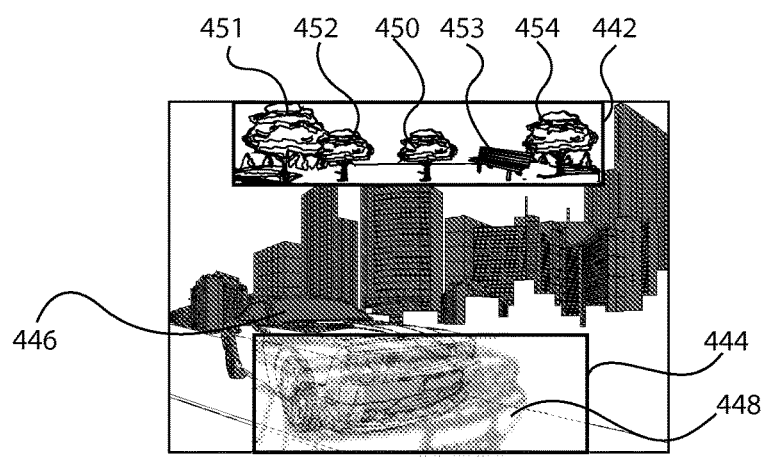

FIG. 4G is a diagram illustrating display of visual representations according to at least one example embodiment. FIG. 4G corresponds with FIG. 4F after a user has shifted her gaze depth from a gaze depth that corresponds with the focal depth of visual representation 444 and to a gaze depth that corresponds with the different focal depth of visual representation 442. The example of FIG. 4G depicts what a user whose gaze depth corresponds with the focal depth associated with visual representation 442 may perceive when viewing the display. The user's gaze depth corresponding with the focal depth associated with visual representation 442 may indicate that the user desires the user's apparatus to cause display of visual representation 442, that the user desires to perceive visual information associated with visual representation 442, that the user desired to bring visual representation 442 into focus, that the user desires to perceive visual information corresponding with a direction that is behind the user, and/or the like. In the example of FIG. 4G, visual representation 442 is displayed on a display region of the see through display. The user's gaze position may, for example, correspond with a position within the display region of visual representation 442 such that a user intent to cause display of visual representation 442, to bring visual representation 442 into focus, and/or the like, may be inferred.

In the example of FIG. 4G, visual representation 442 appears sharper and less blurred when compared to visual representation 444, as focusing upon visual representation 442 may preclude focusing upon visual representation 444. In this manner, visual representation 442 is displayed in a more prominent fashion while still enabling a user to perceive softened details depicted in visual representation 444, and thus allowing the user to remain aware of the user's surroundings, to detect movement associated with visual representation 444, and/or the like. In this manner, if the user desires to perceive visual representation 444, for example, if the user perceives movement with respect to visual representation 444 or desires to reference visual representation 444 to for purposes relating to environmental awareness, the user may quickly adjust the user's gaze depth to correspond with the focal depth of visual representation 444 such that visual representation 444 is displayed more prominently, thus enabling the user to further analyze visual representation 444, determine the source of the movement, and/or the like.

Figure 5:
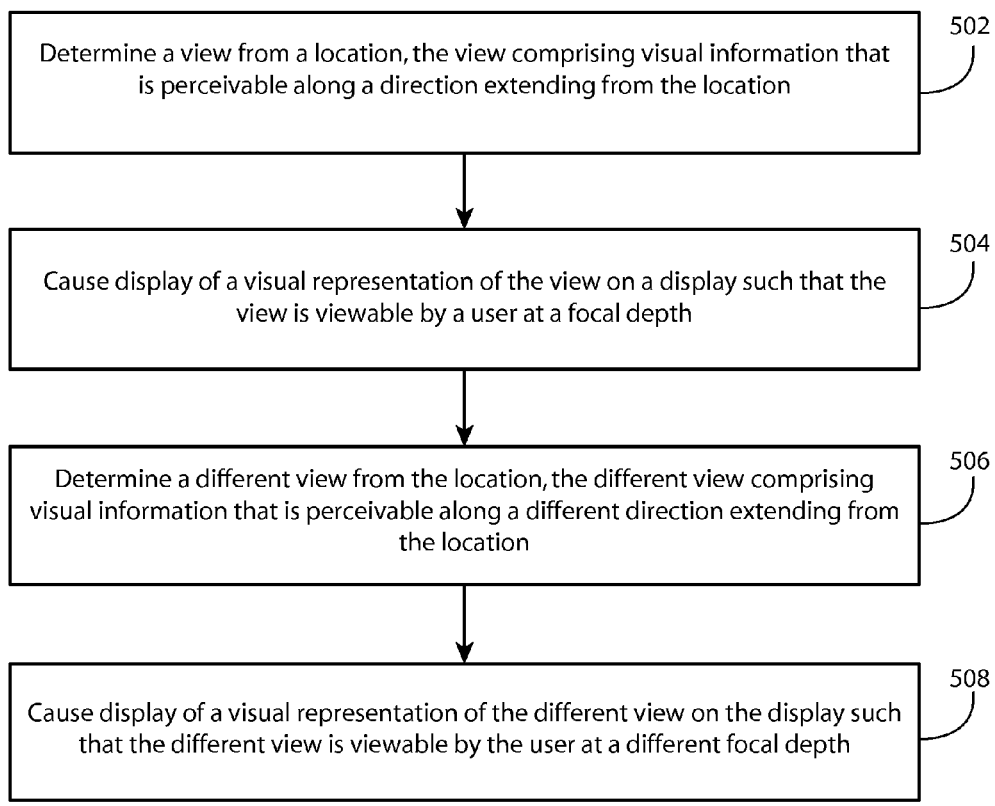
FIG. 5 is a flow diagram illustrating activities associated with display of a visual representation of a view according to at least one example embodiment.

FIG. 5 is a flow diagram illustrating activities associated with display of a visual representation of a view according to at least one example embodiment. In at least one example embodiment, there is a set of operations that corresponds with the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

At block 502, the apparatus determines a view from a location, the view comprising visual information that is perceivable along a direction extending from the location. The determination, the location, the view from the location, the visual information, and the direction extending from the location may be similar as described regarding FIGS. 2A-2B, FIGS. 3A-3B, and FIGS. 4A-4G.

At block 504, the apparatus causes display of a visual representation of the view on a display such that the view is viewable by a user at a focal depth. The causation of display, the visual representation of the view, the display, the user, and the focal depth may be similar as described regarding FIGS. 2A-2B, FIGS. 3A-3B, and FIGS. 4A-4G.

At block 506, the apparatus determines a different view from the location, the different view comprising visual information that is perceivable along a different direction extending from the location. The determination, the different view from the location, the visual information, and the different direction extending from the location may be similar as described regarding FIGS. 2A-2B, FIGS. 3A-3B, and FIGS. 4A-4G.

At block 508, the apparatus causes display of a visual representation of the different view on the display such that the different view is viewable by the user at a different focal depth. The causation of display, the visual representation of the different view, and the different focal depth may be similar as described regarding FIGS. 2A-2B, FIGS. 3A-3B, and FIGS. 4A-4G.

Figure 6:
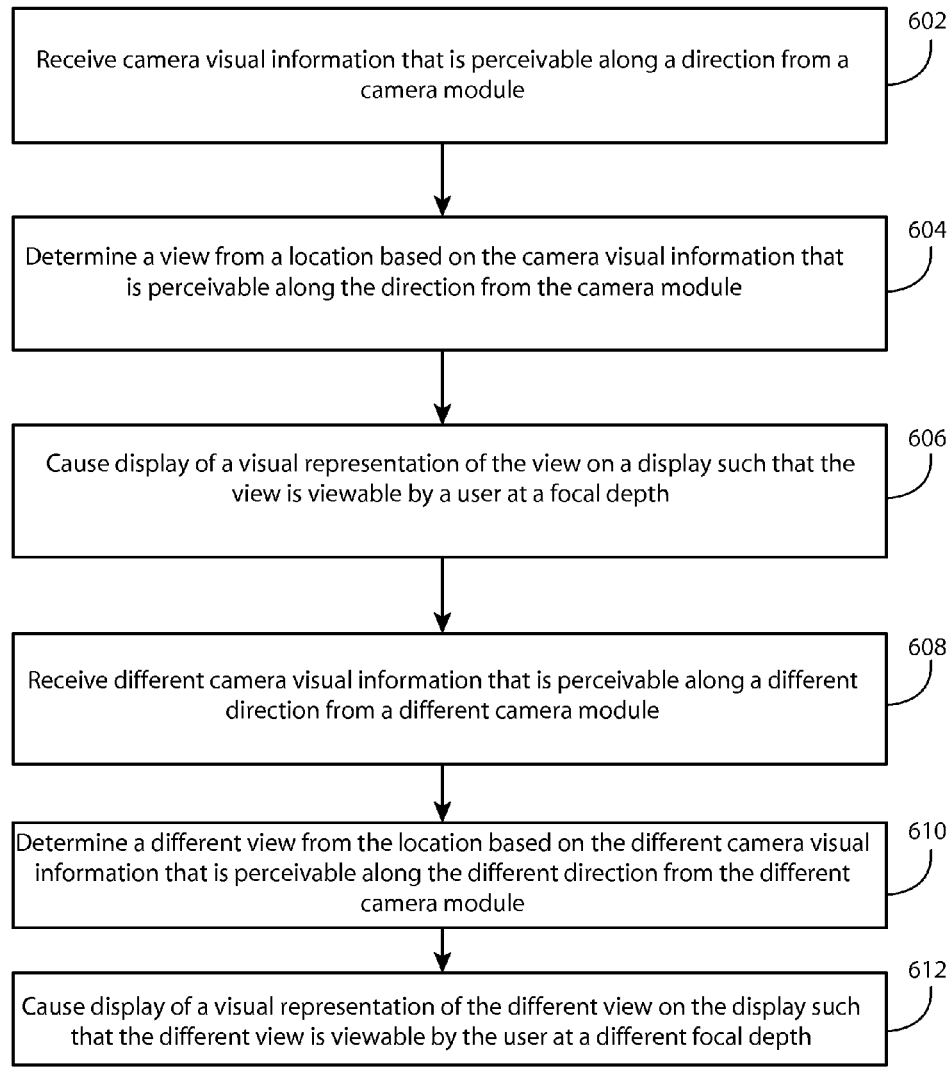
FIG. 6 is a flow diagram illustrating activities associated with display of a visual representation of a view according to at least one example embodiment.

FIG. 6 is a flow diagram illustrating activities associated with display of a visual representation of a view according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

As described previously, in some circumstances, it may be desirable to cause display of one or more visual representations of camera visual information depicting one or more views from a location. In such circumstances, it may be desirable to cause display of a visual representation of a view that is based on camera visual information such that the visual representation of the view is viewable at a focal depth, and cause display of a visual representation of a different view that is based on different camera visual information such that the visual representation of the different view is viewable at a different focal depth.

At block 602, the apparatus receives camera visual information that is perceivable along a direction from a camera module. The receipt, the camera visual information, the direction, and the camera module may be similar as described regarding FIGS. 2A-2B, FIGS. 3A-3B, and FIGS. 4A-4G.

At block 604, the apparatus determines a view from a location based, at least in part, on the camera visual information that is perceivable along the direction from the camera module. The determination, the view, the location, and the camera visual information that is perceivable along the direction from the camera module may be similar as described regarding FIGS. 2A-2B, FIGS. 3A-3B, and FIGS. 4A-4G.

At block 606, the apparatus causes display of a visual representation of the view on a display such that the view is viewable by a user at a focal depth. The causation of display, the visual representation of the view, the display, the user, and the focal depth may be similar as described regarding FIGS. 2A-2B, FIGS. 3A-3B, and FIGS. 4A-4G.

At block 608, the apparatus receives different camera visual information that is perceivable along a different direction from a different camera module. The receipt, the different camera visual information, the different direction, and the different camera module may be similar as described regarding FIGS. 2A-2B, FIGS. 3A-3B, and FIGS. 4A-4G.

At block 610, the apparatus determines a different view from the location based, at least in part, on the different camera visual information that is perceivable along the different direction from the different camera module. The determination, the different view, and the different camera visual information that is perceivable along the different direction from the camera module may be similar as described regarding FIGS. 2A-2B, FIGS. 3A-3B, and FIGS. 4A-4G.

At block 612, the apparatus causes display of a visual representation of the different view on the display such that the different view is viewable by the user at a different focal depth. The causation of display, the visual representation of the different view, and the different focal depth may be similar as described regarding FIGS. 2A-2B, FIGS. 3A-3B, and FIGS. 4A-4G.

Figure 7:
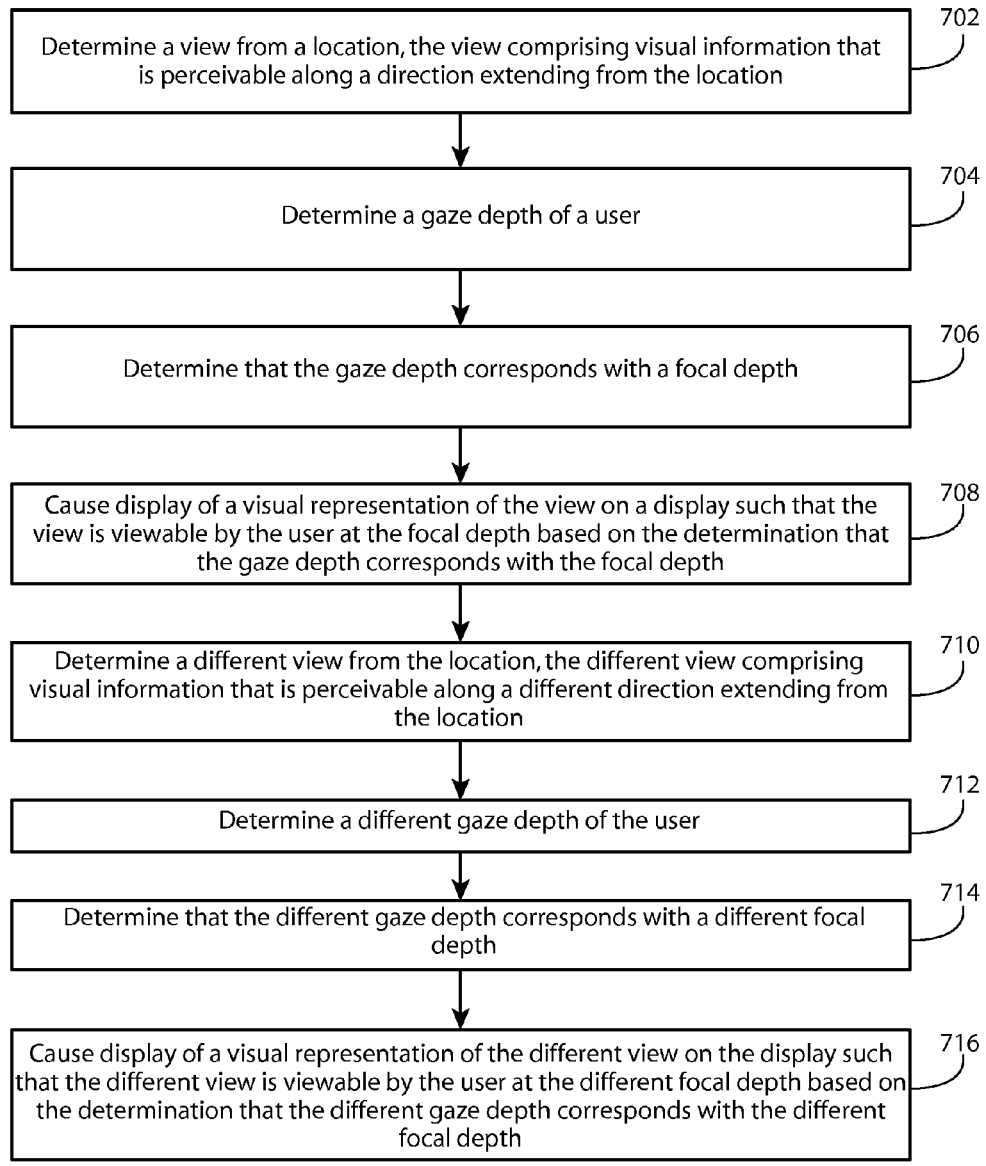
FIG. 7 is a flow diagram illustrating activities associated with display of a visual representation of a view according to at least one example embodiment.

FIG. 7 is a flow diagram illustrating activities associated with display of a visual representation of a view according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As previously discussed, in some circumstances, it may be desirable to cause display of a visual representation of a view based on a user's gaze depth corresponding with a focal depth, and cause display of a visual representation of a different view based on the user's gaze depth corresponding with a different focal depth. For example, the user may adjust her gaze depth in order to view the visual representation of the view, the visual representation of the different view, and/or the like.

At block 702, the apparatus determines a view from a location, the view comprising visual information that is perceivable along a direction extending from the location. The determination, the location, the view from the location, the visual information, and the direction extending from the location may be similar as described regarding FIGS. 2A-2B, FIGS. 3A-3B, and FIGS. 4A-4G.

At block 704, the apparatus determines a gaze depth of a user. The determination, the gaze depth, and the user may be similar as described regarding FIGS. 2A-2B, FIGS. 3A-3B, and FIGS. 4A-4G.

At block 706, the apparatus determines that the gaze depth corresponds with a focal depth. The determination and the focal depth may be similar as described regarding FIGS. 2A-2B, FIGS. 3A-3B, and FIGS. 4A-4G.

At block 708, the apparatus causes display of a visual representation of the view on a display such that the view is viewable by the user at the focal depth based, at least in part, on the determination that the gaze depth corresponds with the focal depth. The causation of display, the visual representation of the view, the display, the user, and the focal depth may be similar as described regarding FIGS. 2A-2B, FIGS. 3A-3B, and FIGS. 4A-4G.

At block 710, the apparatus determines a different view from the location, the different view comprising visual information that is perceivable along a different direction extending from the location. The determination, the different view from the location, the visual information, and the different direction extending from the location may be similar as described regarding FIGS. 2A-2B, FIGS. 3A-3B, and FIGS. 4A-4G.

At block 712, the apparatus determines a different gaze depth of the user. The determination and the different gaze depth may be similar as described regarding FIGS. 2A-2B, FIGS. 3A-3B, and FIGS. 4A-4G.

At block 714, the apparatus determines that the different gaze depth corresponds with a different focal depth. The determination and the different focal depth may be similar as described regarding FIGS. 2A-2B, FIGS. 3A-3B, and FIGS. 4A-4G.

At block 716, the apparatus causes display of a visual representation of the different view on a display such that the different view is viewable by the user at the different focal depth based, at least in part, on the determination that the different gaze depth corresponds with the different focal depth. The causation of display, the visual representation of the view, the display, the user, and the focal depth may be similar as described regarding FIGS. 2A-2B, FIGS. 3A-3B, and FIGS. 4A-4G.

Figure 8:
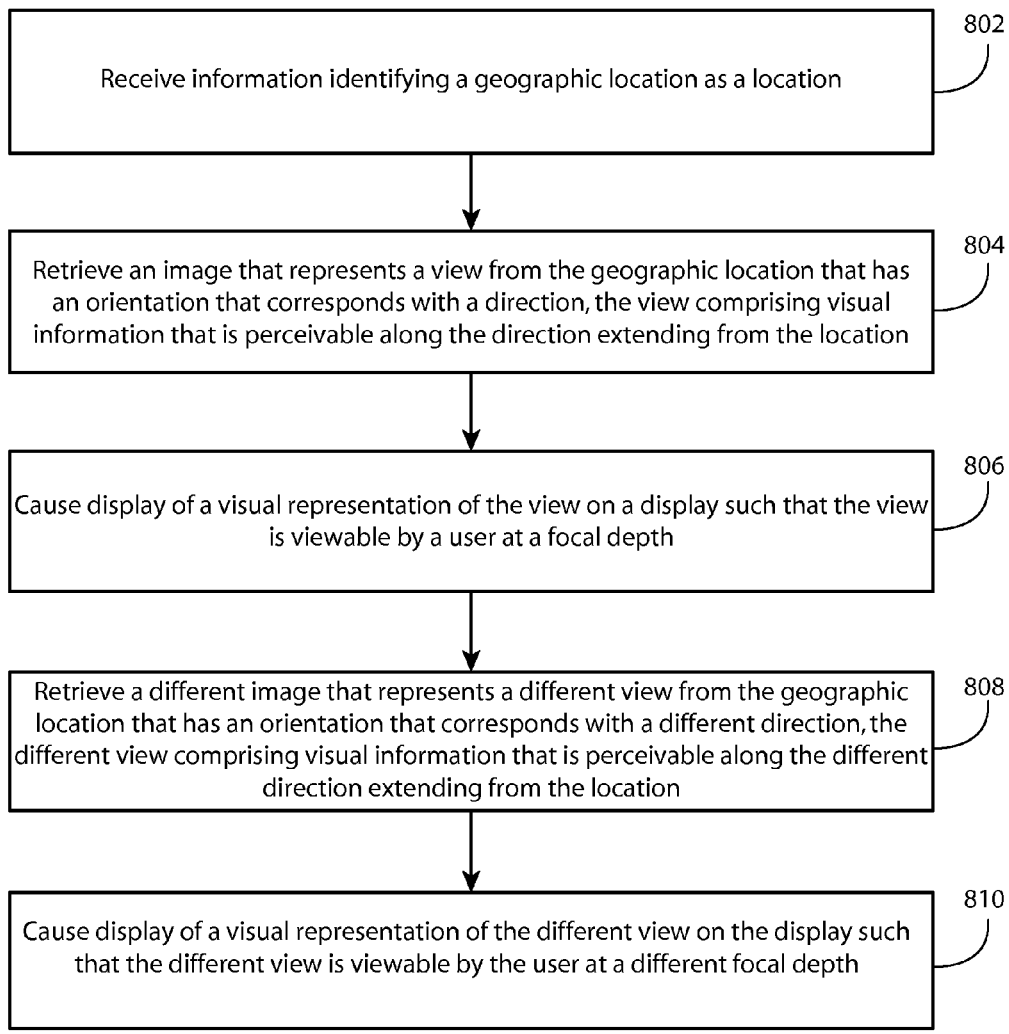
FIG. 8 is a flow diagram illustrating activities associated with display of a visual representation of a view according to at least one example embodiment.

FIG. 8 is a flow diagram illustrating activities associated with display of a visual representation of a view according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

At block 802, the apparatus receives information identifying a geographic location as a location. The receipt, the geographic location, and the location may be similar as described regarding FIGS. 2A-2B, FIGS. 3A-3B, and FIGS. 4A-4G.

At block 804, the apparatus retrieves an image that represents a view from the geographic location that has an orientation that corresponds with the direction, the view comprising visual information that is perceivable along a direction extending from the location. The retrieval, the image, the view, the orientation, the direction, and the visual information that is perceivable along the direction extending from the location may be similar as described regarding FIGS. 2A-2B, FIGS. 3A-3B, and FIGS. 4A-4G.

At block 806, the apparatus causes display of a visual representation of the view on a display such that the view is viewable by a user at a focal depth. The causation of display, the visual representation of the view, the display, the user, and the focal depth may be similar as described regarding FIGS. 2A-2B, FIGS. 3A-3B, and FIGS. 4A-4G.

At block 808, the apparatus retrieves a different image that represents a different view from the geographic location that has an orientation that corresponds with a different direction, the view comprising visual information that is perceivable along the different direction extending from the location. The retrieval, the different image, the different view, the orientation, the different direction, and the visual information that is perceivable along the different direction extending from the location may be similar as described regarding FIGS. 2A-2B, FIGS. 3A-3B, and FIGS. 4A-4G.

At block 810, the apparatus causes display of a visual representation of the different view on the display such that the different view is viewable by the user at a different focal depth. The causation of display, the visual representation of the different view, and the different focal depth may be similar as described regarding FIGS. 2A-2B, FIGS. 3A-3B, and FIGS. 4A-4G.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 504 of FIG. 5 may be performed after block 506 of FIG. 5. In another example, block 702 of FIG. 7 may be performed after block 706 of FIG. 7. Furthermore, if desired, one or more of the above-described functions may be optional or may be combined. For example, block 802 of FIG. 8 may be optional and/or combined with block 804 of FIG. 8.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor; and
   at least one memory comprising computer program code, the memory and the computer program code configured to, executed by the processor, cause the apparatus to perform at least the following:
   determination of a view captured by a camera module of a device, the camera module positioned in a first orientation, the first view comprising visual information that is perceivable along a first direction extending from a location of the device;
   causation of display of a visual representation of the view on a display such that the first view is viewable by a user at a focal depth;
   determination of a different view captured by the camera module or a different camera module of the device, positioned in a different orientation from that of the first orientation, the different view comprising visual information that is perceivable along a different direction extending from the location of the device; and
   causation of display of a visual representation of the different view on the display such that the different view is viewable by the user at a different focal depth while the first view is viewable by the user at the first focal depth, wherein at least one of the different view or the first view at least partially precludes the other of the different view or the first view.

2. The apparatus of claim 1, wherein the display is a see-through display, and the first view is visual information indicative of a non-unitary magnification of visual information that is perceivable along the direction from the location.

3. The apparatus of claim 1, wherein the memory comprises computer program code configured to, executed by the processor, cause the apparatus to perform receipt of camera visual information that is perceivable along the direction from a camera module, wherein determination of the view is based at least in part on the camera visual information.

4. The apparatus of claim 1, wherein the memory comprises computer program code configured to, executed by the processor, cause the apparatus to perform receipt of camera visual information, from a camera module, that is perceivable along the different direction from the location, wherein determination of the different view is based at least in part on the camera visual information.

5. The apparatus of claim 1, wherein the different view is a panoramic visual representation that further comprises visual information that is perceivable along another direction that bisects the direction and the different direction.

6. The apparatus of claim 1, wherein the memory comprises computer program code configured to, executed by the processor, cause the apparatus to perform:
   determination of a gaze depth of the user; and
   determination that the gaze depth corresponds with the different focal depth, wherein causation of display of the visual representation of the different view is based, at least in part, on the determination that the gaze depth corresponds with the different focal depth.

7. The apparatus of claim 1, wherein the memory comprises computer program code configured to, executed by the processor, cause the apparatus to perform:
   determination of a gaze depth of the user; and
   determination that the gaze depth corresponds with the focal depth, wherein causation of display of the visual representation of the view is based, at least in part, on the determination that the gaze depth corresponds with the focal depth.

8. The apparatus of claim 1, wherein the memory comprises computer program code configured to, executed by the processor, cause the apparatus to perform:
   determination of a third view from a different location, the third view comprising visual information that is perceivable along a third direction extending from the different location; and
   causation of display of a visual representation of the third view on the display such that the third view is viewable by the user at a third focal depth.

9. The apparatus of claim 1, wherein the location is a geographic location of the apparatus, determination of the first view from the location comprises determination of the first view from the geographic location of the apparatus, and determination of the different view from the location comprises determination of the different view from the geographic location of the apparatus.

10. A method comprising:
- determining a first view captured by a camera module of a device, the camera module positioned in a first orientation, the first view comprising visual information that is perceivable along a first direction extending from a location of the device;
- causing display of a visual representation of the view on a display such that the first view is viewable by a user at a first focal depth;
- determining a different view captured by the camera module or a different camera module of the device, positioned in a different orientation from that of the first orientation, the different view comprising visual information that is perceivable along a different direction extending from the location of the device; and
- causing display of a visual representation of the different view on the display such that the different view is viewable by the user at a different focal depth while the first view is viewable by the user at the first focal depth, wherein at least one of the different view or the first view at least partially precludes the other of the different view or the first view.

11. The method of claim 10, further comprising receiving camera visual information that is perceivable along the direction from the camera module, wherein determination of the first view is based at least in part on the camera visual information.

12. The method of claim 10, further comprising receiving camera visual information, from the camera module, that is perceivable along the different direction from the location, wherein determination of the different view is based at least in part on the camera visual information.

13. The method of claim 10, further comprising:
- determining a gaze depth of a user; and
- determining that the gaze depth corresponds with the different focal depth, wherein causation of display of the visual representation of the different view is based, at least in part, on the determination that the gaze depth corresponds with the different focal depth.

14. The method of claim 10, further comprising:
- determining a gaze depth of the user; and
- determining that the gaze depth corresponds with the first focal depth, wherein causation of display of the visual representation of the view is based, at least in part, on the determination that the gaze depth corresponds with the first focal depth.

15. The method of claim 10, further comprising:
- determining a third view from a different location, the third view comprising visual information that is perceivable along a third direction extending from the different location; and
- causing display of a visual representation of the third view on the display such that the third view is viewable by the user at a third focal depth.

16. The method of claim 10, wherein the location is a geographic location of the apparatus, determination of the first view from the location comprises determination of the first view from the geographic location of the apparatus, and determination of the different view from the location comprises determination of the different view from the geographic location of the apparatus.

17. At least one computer-readable medium encoded with instructions that, when executed by a processor, perform:
- determining a first view captured by a camera module of a device, the camera module positioned in a first orientation, the first view comprising visual information that is perceivable along a first direction extending from a location of the device;
- causing display of a visual representation of the view on a display such that the first view is viewable by a user at a first focal depth;
- determining a different view captured by the camera module or a different camera module of the device, positioned in a different orientation from that of the first orientation, the different view comprising visual information that is perceivable along a different direction extending from the location of the device; and
- causing display of a visual representation of the different view on the display such that the different view is viewable by the user at a different focal depth while the first view is viewable by the user at the first focal depth, wherein at least one different view or the first view at least partially precludes the other of the different view or the first view.

18. The medium of claim 17, further encoded with instructions that, when executed by a processor, perform:
- determining a gaze depth of the user; and
- determining that the gaze depth corresponds with the different focal depth, wherein causation of display of the visual representation of the different view is based, at least in part, on the determination that the gaze depth corresponds with the different focal depth.

19. The medium of claim 17, further encoded with instructions that, when executed by a processor, perform:
- determining a gaze depth of the user; and
- determining that the gaze depth corresponds with the first focal depth, wherein causation of display of the visual representation of the view is based, at least in part, on the determination that the gaze depth corresponds with the first focal depth.

20. The medium of claim 17, further encoded with instructions that, when executed by a processor, perform:
- determining a third view from a different location, the third view comprising visual information that is perceivable along a third direction extending from the different location; and
- causing display of a visual representation of the third view on the display such that the third view is viewable by the user at a third focal depth.

* * * * *

UNITED STATES PATENT AND TRADEMARK OFFICE
CERTIFICATE OF CORRECTION

PATENT NO. : 10,321,124 B2
APPLICATION NO. : 15/106789
DATED : June 11, 2019
INVENTOR(S) : Leo Kärkkäinen, Mikko Uusitalo and Akos Vetek Page 1 of 1

It is certified that error appears in the above-identified patent and that said Letters Patent is hereby corrected as shown below:

In the Claims

Claim 1, at Column 29, Line 56: "a view" should be -- a first view --
Claim 1, at Column 29, Line 61: "the view" should be -- the first view --
Claim 1, at Column 29, Line 63: "a focal depth" should be -- a first focal depth --
Claim 3, at Column 30, Line 19: "a camera module" should be -- the camera module --
Claim 3, at Column 30, Line 20: "the view" should be -- the first view --
Claim 4, at Column 30, Line 25: "a camera module" should be -- the camera module --
Claim 7, at Column 30, Line 47: "focal depth" should be -- first focal depth --
Claim 7, at Column 30, Line 48: "the view" should be -- the first view --
Claim 7, at Column 30, Line 50: "focal depth" should be -- first focal depth --
Claim 10, at Column 31, Line 7: "the view" should be -- the first view --
Claim 14, at Column 31, Line 44: "the view" should be -- the first view --
Claim 17, at Column 32, Line 6: "one computer-readable medium" should be -- one non-transitory computer readable medium --
Claim 17, at Column 32, Line 13: "the view" should be -- the first view --
Claim 17, at Column 32, Line 26: "at least one different view" should be -- at least one of the different view --
Claim 19, at Column 32, Line 42: "the view" should be -- the first view --

Signed and Sealed this
Thirty-first Day of December, 2019

Andrei Iancu
*Director of the United States Patent and Trademark Office*